(12) United States Patent
Giesen et al.

(10) Patent No.: US 8,599,896 B2
(45) Date of Patent: Dec. 3, 2013

(54) LASER AMPLIFIER SYSTEM

(75) Inventors: Adolf Giesen, Aichtal (DE); Jens Mende, Leinfelden-Echterdingen (DE); Gerhard Spindler, Waldshut-Tiengen (DE); Jochen Speiser, Stuttgart (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 0 days.

(21) Appl. No.: 13/283,924

(22) Filed: Oct. 28, 2011

(65) Prior Publication Data

US 2012/0170607 A1 Jul. 5, 2012

Related U.S. Application Data

(63) Continuation of application No. PCT/EP2010/055755, filed on Apr. 28, 2010.

(30) Foreign Application Priority Data

Apr. 30, 2009 (DE) .......................... 10 2009 020 768

(51) Int. Cl.
*H01S 3/082* (2006.01)

(52) U.S. Cl.
USPC .................... 372/97; 372/94; 372/95; 372/98

(58) Field of Classification Search
USPC .......................................................... 372/97
See application file for complete search history.

(56) References Cited

U.S. PATENT DOCUMENTS

| 7,711,025 | B2 | 5/2010 | Schmitz et al. |
| 7,826,513 | B2 | 11/2010 | Bossert et al. |
| 7,970,039 | B2 | 6/2011 | Mason et al. |
| 2006/0140241 | A1* | 6/2006 | Schmitz et al. ................. 372/92 |
| 2007/0280325 | A1 | 12/2007 | Wang |
| 2008/0037597 | A1 | 2/2008 | Mason et al. |

(Continued)

FOREIGN PATENT DOCUMENTS

| EP | 1 677 394 | 7/2006 |
| EP | 2 031 712 | 3/2009 |
| WO | 2005/083851 | 9/2005 |

OTHER PUBLICATIONS

Voss, A. et al., "Intra-Cavity Beam Shaping for High Power Thin-Disk Lasers", Proceedings of the International Society for Optical Engineering (SPIE), SPIE, USA vol. 6346, Apr. 26, 2007, 12 pages.

(Continued)

*Primary Examiner* — Xinning Niu
(74) *Attorney, Agent, or Firm* — Lipsitz & McAllister, LLC

(57) ABSTRACT

A laser amplifier system is provided which comprises a resonator with optical resonator elements which determine a course of a resonator radiation field which propagates along an optical axis and at least one laser-active medium (LM). The resonator is designed as a split resonator and has a first resonator section which extends from a first virtual plane of separation and a second resonator section which extends from a second virtual plane of separation. The resonator sections are dimensioned optically such that the resonator radiation field has radiation field states corresponding to the same resonator modes in each of the virtual planes of separation. An amplifying unit optically independent of the resonator is arranged between the first and the second virtual planes of separation. The amplifying unit comprises the at least one laser-active medium and couples the radiation field states in a neutral manner with respect to the resonator modes.

32 Claims, 20 Drawing Sheets

(56) References Cited

U.S. PATENT DOCUMENTS

2009/0059974 A1 3/2009 Wang et al.
2009/0059991 A1 3/2009 Bossert et al.
2009/0268775 A1 10/2009 Holmes
2010/0027572 A1 2/2010 Widen et al.

OTHER PUBLICATIONS

Mende, J. et al., "Concept of Neutral Gain Modules for Power Scaling of Thin-Disk Lasers", Applied Physics B; Lasers and Optics, Springer, Berlin, Germany, vol. 97, No. 2, Sep. 12, 2009, pp. 307-315.
Mende, J. et al., "Thin Disk Laser: Power Scaling to The KW Regime in Fundamental Mode Operation", Proceedings of the SPIE, The International Society for Optical Engineering SPIE, The International Society for Optical Engineering USA, vol. 7193, Jan. 25, 2009, 12 pages.
Hunt, J. T. et al., "Suppression of Self-Focusing Through Low-Pass Spatial Filtering and Relay Imaging", Applied Optics USA, vol. 17, No. 13, Jul. 1, 1978, pp. 2053-2057.
W. Koechner, "Solid-State Laser Engineering", Springer-Verlag New York Heidelberg Berlin 1976, pp. 197-198.

* cited by examiner

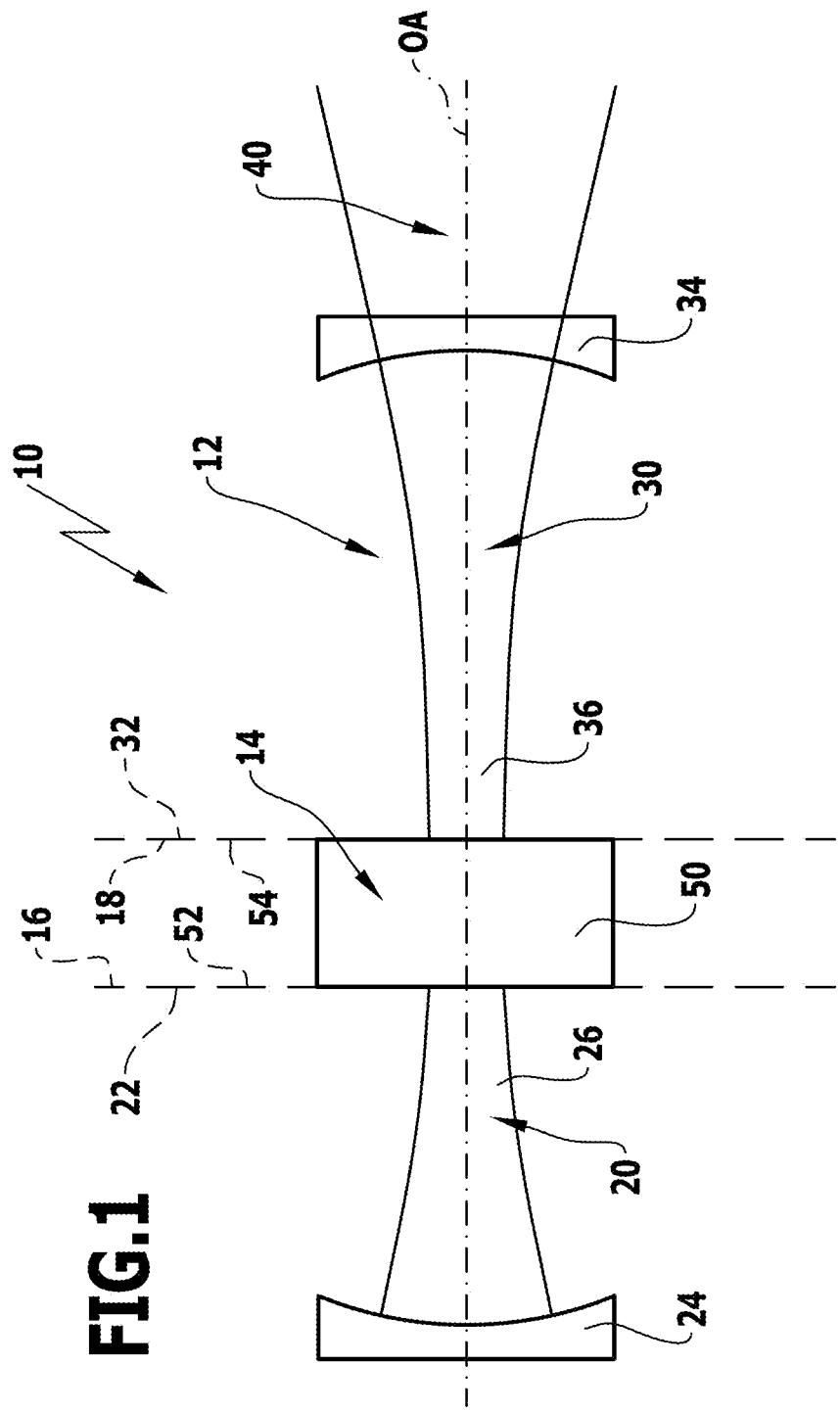

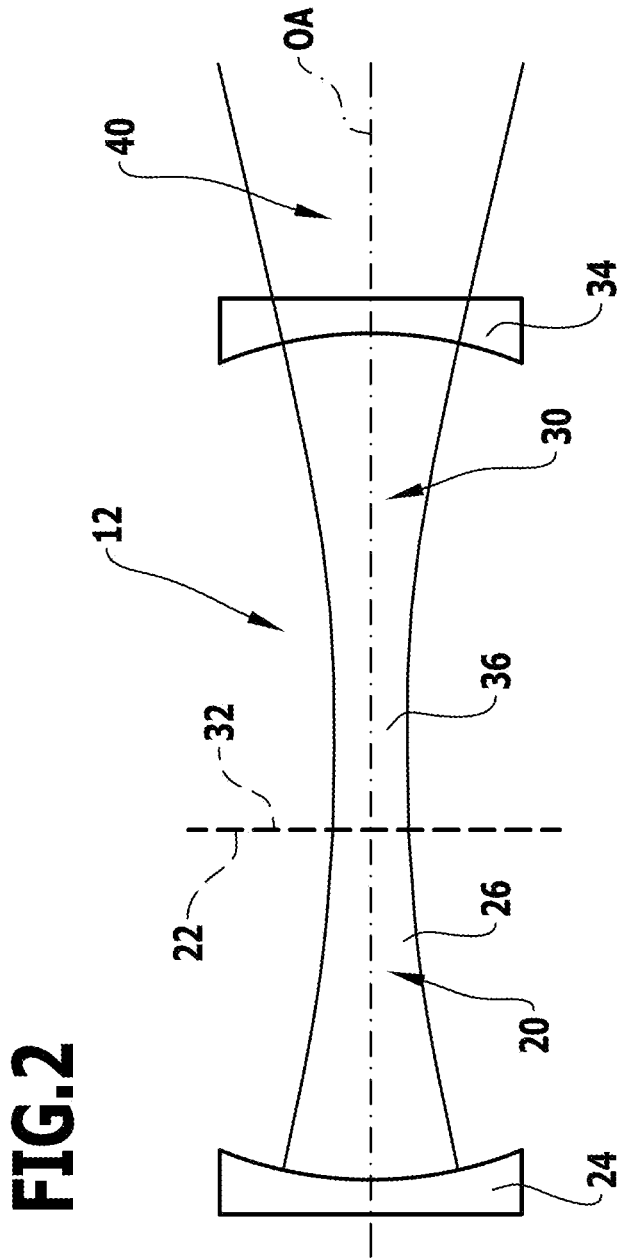

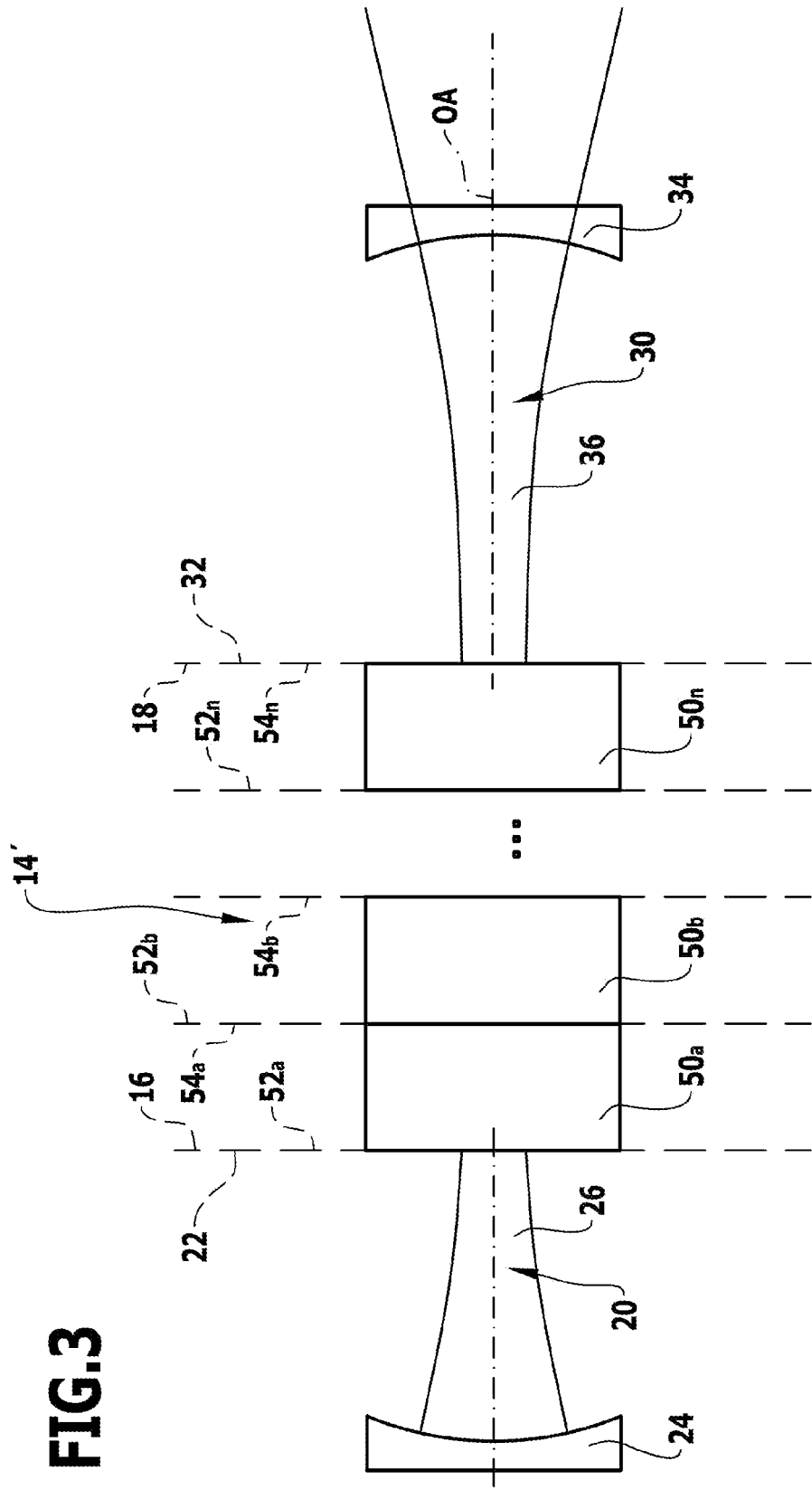

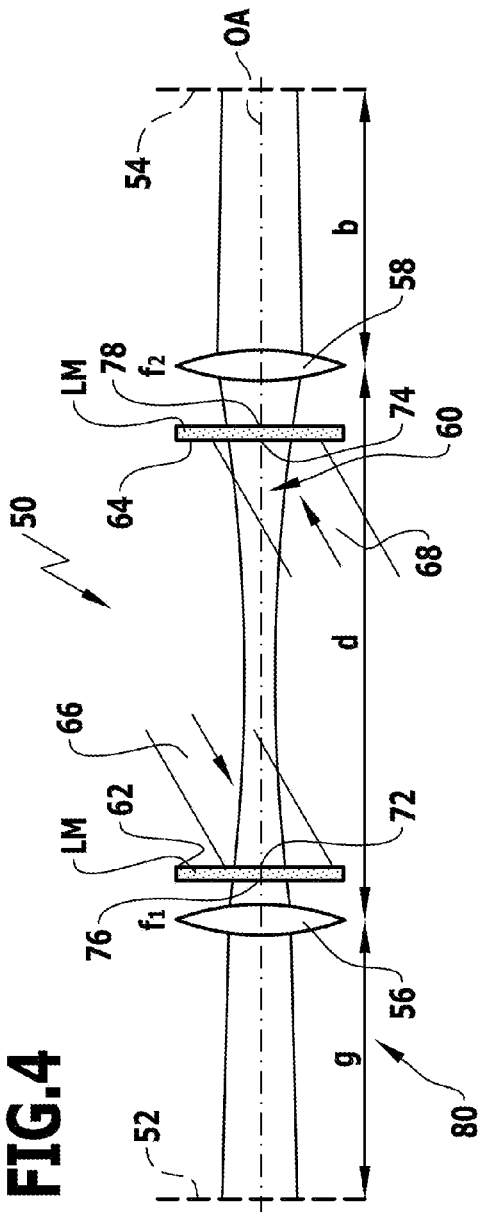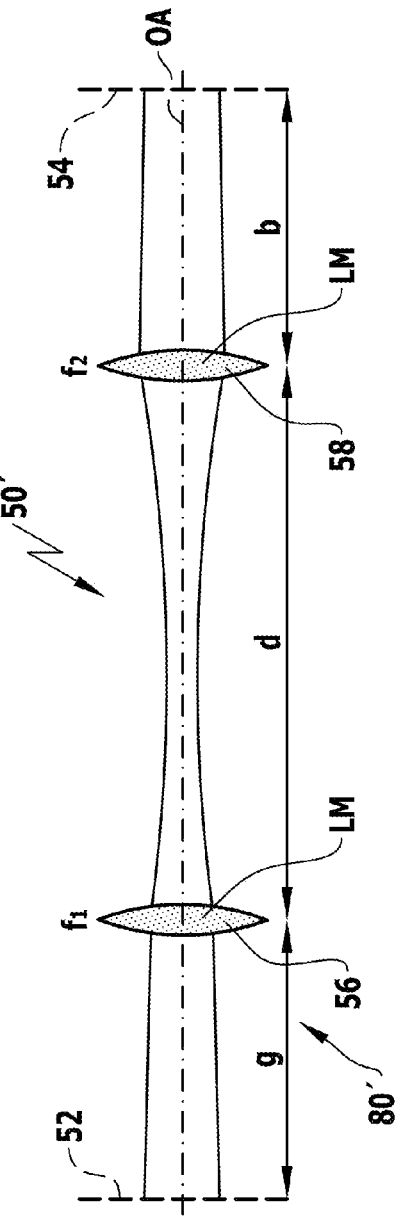

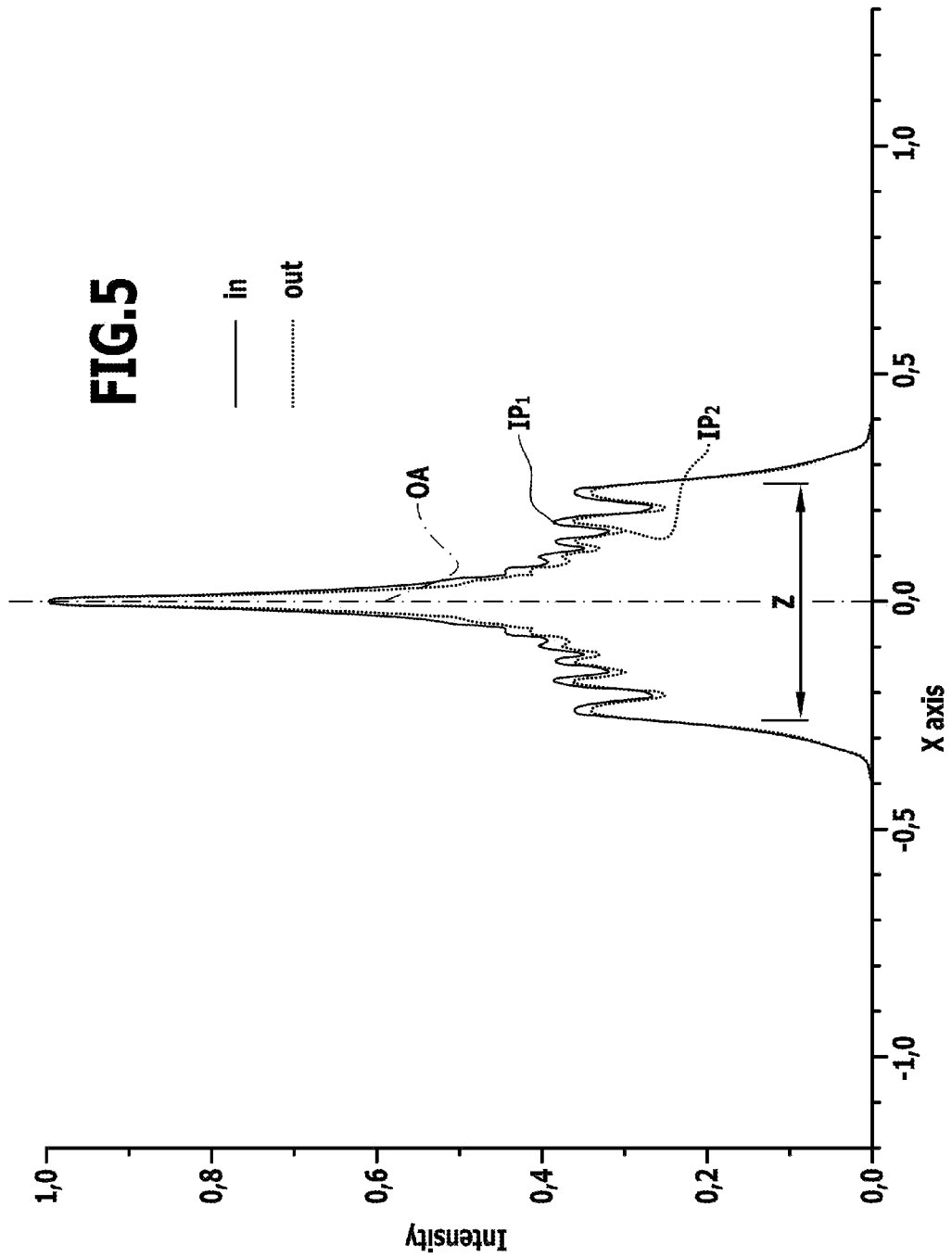

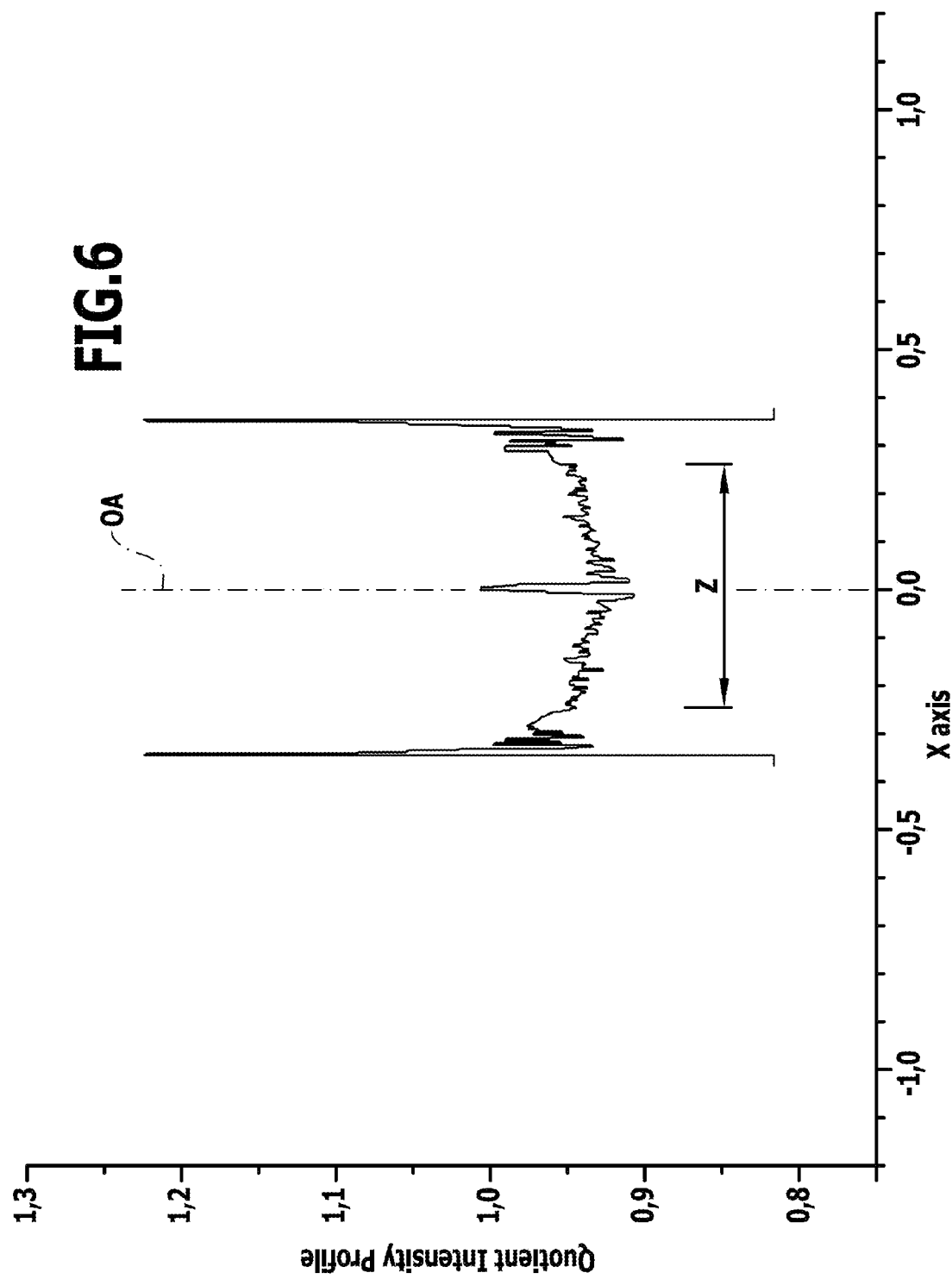

LASER AMPLIFIER SYSTEM

This application is a continuation of International application number PCT/EP2010/055755 filed on Apr. 28, 2010.

This patent application claims the benefit of International application No. PCT/EP2010/055755 of Apr. 28, 2010 and German application No. 10 2009 020 768.6 of Apr. 30, 2009, the teachings and disclosure of which are hereby incorporated in their entirety by reference thereto.

BACKGROUND OF THE INVENTION

The invention relates to a laser amplifier system, comprising a resonator with optical resonator elements which determine a course of a resonator radiation field which propagates along an optical axis and at least one laser-active medium.

Laser amplifier systems of this type are conventional laser amplifier systems, wherein the problem with the configuration of the laser amplifier systems is that the optical behavior of the laser-active medium has to be taken into consideration for the configuration of the resonator and, therefore, the resonator radiation field which results is always dependent on the optical behavior of the laser-active medium.

Particularly when the optical behavior of the laser-active medium varies, the resonator radiation field obtained will also vary and so the configuration of the resonator has to be adapted to the varying optical properties of the laser-active medium.

The object underlying the invention is, therefore, to improve a laser amplifier system of the type described at the outset in such a manner that the configuration of the resonator can be simplified.

SUMMARY OF THE INVENTION

This object will be accomplished in accordance with the invention, in a laser amplifier system of the type described at the outset, in that the resonator is designed as a split resonator and has a first resonator section which extends from a first virtual plane of separation and a second resonator section which extends from a second virtual plane of separation, that the resonator sections are dimensioned optically such that the resonator radiation field has radiation field states which correspond to the same resonator modes in each of the virtual planes of separation, that an amplifying unit which is optically independent of the resonator is arranged between the first and the second virtual planes of separation, this amplifying unit comprising the at least one laser-active medium and coupling the radiation field states which correspond to the same resonator modes in a neutral manner with respect to the resonator modes.

The advantage of the solution according to the invention is to be seen in the fact that the amplifying unit is optically independent of the resonator and, therefore, the dimensioning of the resonator and the determination of the resonator modes can be brought about independently of the optical properties of the amplifying unit.

At the same time, the possibility is created of constructing and operating the amplifying unit independently of the resonator so that the amplifying unit, for its part, can likewise be dimensioned independently of the resonator.

One particularly advantageous solution provides for the amplifying unit to comprise at least one amplifier module, wherein the at least one laser-active medium is provided in the amplifier module.

The at least one amplifier module can, in this respect, be designed in the most varied of ways. It can be constructed such that it behaves altogether, with all the remaining optical elements of the amplifying unit, in a neutral manner with respect to the resonator modes.

It is particularly favorable when the at least one amplifier module behaves in an optically neutral manner with respect to the resonator modes so that the amplifier module forms a unit which can preferably be arranged in the amplifying unit, i.e. many times in the amplifying unit, in a scalable manner.

In order for the amplifying unit to behave, altogether, in a neutral manner with respect to the resonator modes, it is preferably provided for the at least one amplifier module, which behaves in a neutral manner with respect to the resonator modes, to be coupled to the virtual planes of separation in an optically neutral manner.

One particularly favorable solution provides for each amplifier module to extend between a first virtual module end plane and a second virtual module end plane and be dimensioned optically such that during operation of the laser amplifier system with at least an average power within a predetermined power range it transforms an intensity profile representing radiation field states of an amplifier module radiation field in one of the module end planes to the other one of the module end planes in at least one central area in a manner retaining the intensity profile shape and that a first one of the module end planes is coupled to the first plane of separation and a second one of the module end planes is coupled to the second plane of separation.

It is thus ensured with this solution that the amplifier module performs a transformation of the radiation field states between the two module end planes which does not influence the resonator modes negatively on account of the transformation which retains the intensity profile shape.

Furthermore, it is preferably provided for the intensity values of the intensity profile normalized to its maximum value, these intensity values representing the individual radiation field state values, to deviate from one another by a maximum of 20% of the maximum value in the locations in the module end planes respectively associated with one another as a result of imaging, at least in the central area.

It is preferably determined as a result of this condition that the individual intensity values of the intensity profile have only a limited variation from one another, as a result of which the resonator modes do not experience any fundamental changes.

It is favorable when the intensity values of the intensity profile, which represent individual radiation field state values, deviate from one another by a maximum of 15% of the maximum value in the locations in the module end planes respectively associated with one another as a result of imaging, at least in the central area.

It is even better when the intensity values of the intensity profile, which represent individual radiation field state values, deviate from one another by a maximum of 10% of the maximum value in the locations in the module end planes respectively associated with one another as a result of imaging, at least in the central area and it is even more advantageous when the intensity values of the intensity profile, which represent individual radiation field state values, deviate from one another by a maximum of 5% of the maximum value in the locations in the module end planes respectively associated with one another as a result of imaging, at least in the central area.

The concept of the association of the individual locations as a result of imaging is to be understood such that in the case of an exact imaging the individual locations are clearly associated with one another, in the case of an out-of-focus imaging the association is brought about in that in the case of an out-of-focus image of a location of one module end plane in the other module end plane the center point of the out-of-focus image of this location is to be considered as associated location.

It is particularly favorable when the at least one amplifier module transforms the intensity profile normalized to its maximum value in the one virtual module end plane to the other virtual module end plane essentially in a manner retaining the intensity profile.

Furthermore, an additional, advantageous condition for the behavior of the amplifier module provides for the at least one amplifier module to transform a phase profile representing radiation field states from one module end plane to the other module end plane at least in a central area in a manner retaining the phase profile shape.

This additional condition represents an additional clarification for an optimum optical behavior of the amplifier module with insignificant influencing of the resonator modes.

In this respect, it is particularly favorable when the difference in the phase values of the phase profiles in the locations in the module end planes respectively associated with one another as a result of imaging is less than 4 rad at every point.

It is better when the difference in the phase profiles in the module end planes is less than 3 rad at every point.

It is even better when the difference in the phase profiles in the module end planes is less than 2 rad at every point and it is particularly favorable when the difference in the phase profiles in the module end planes is less than 1 rad at every point.

The central area has not been defined in greater detail in conjunction with the preceding explanations concerning the individual embodiments.

The central area is expediently defined such that the central area corresponds to the smallest cross sectional area of the amplifier module radiation field which comprises 80% of the overall power of the amplifier module radiation field.

In conjunction with the arrangement of the amplifier modules in the amplifying unit, only an optical coupling thereof has so far been defined.

One particularly favorable solution provides for the amplifying unit to comprise one amplifier module, with which a first one of the module end planes is coupled in an optically neutral manner, preferably coincides, with the first plane of separation and a second one of the module end planes is coupled in an optically neutral manner, preferably coincides, with the second plane of separation.

Furthermore, only at least one amplifier module has so far been specified in conjunction with the amplifying unit.

One particularly favorable solution provides for the amplifying unit to comprise several amplifier modules. With this solution, the advantage is consistently exploited that the amplifier modules themselves behave in a manner retaining the intensity profile shape and, where applicable, also advantageously in a manner retaining the phase profile shape so that it is possible to use several such amplifier modules, which are, where required, of an identical construction, in one amplifying unit.

In this respect, it is particularly favorable when several amplifier modules which form an entirety are arranged one after the other between the planes of separation and when in the case of the consecutive amplifier modules a first respective module end plane is coupled in an optically neutral manner to a second respective module end plane and when in the entirety of the amplifier modules the first module end plane of a first amplifier module is coupled optically to one of the planes of separation and the second module end plane of the last amplifier module is coupled optically to the other one of the planes of separation.

One particularly favorable solution provides for a first respective module end plane of the consecutive amplifier modules to coincide with a second respective module end plane and for the first module end plane of a first amplifier module in the entirety of the amplifier modules to be coupled in an optically neutral manner, preferably coincide, with one of the planes of separation and the second module end plane of the last amplifier module to be coupled in an optically neutral manner, preferably coincide, with the other one of the planes of separation.

Alternatively or in addition to the solutions described thus far, one advantageous embodiment of a laser system according to the invention provides for the resonator to be designed as a split resonator and to have a first resonator section which extends from a first virtual plane of separation and a second resonator section which extends from a second virtual plane of separation, for at least one amplifier module which comprises the at least one laser-active medium to be arranged between the first and the second virtual planes of separation, for the at least one amplifier module to be arranged between the planes of separation such that a first module end plane of the at least one amplifier module is coupled in an optically neutral manner to the first plane of separation and a second module end plane of the at least one amplifier module is coupled in an optically neutral manner to the second plane of separation and for the at least one amplifier module, during operation of the laser amplifier system with at least an average power within a predetermined power range, to form an amplifier module radiation field between the module end planes which couples the radiation field states in the module end planes to one another in an optically quasi-neutral manner at least in a central area.

An optically quasi-neutral, in particular neutral, coupling of the at least one amplifier module to the first plane of separation or the second plane of separation is to be understood such that this coupling leads to an essentially identical transformation of the radiation field states in the respective plane of separation with the radiation field states in the corresponding, coupled module end plane.

For example, this optically quasi-neutral coupling of the planes of separation is preferably defined in such a manner that an ABCD beam matrix, defined in accordance with A. E. Siegmann "Lasers", Univ. Science Books, Mill Valley, Calif., USA, 1986, pages 581 et seq., has the following values:

$0.97 < |A| < 1.03$ $-0.1\ m < B < 0.1\ m$ $-0.1\ 1/m < C < 0.1\ 1/m$ $0.97 < |D| < 1.03.$

Such a laser amplifier system according to the invention can have, in principle, only one such amplifier module.

It is particularly favorable when several amplifier modules forming an entirety are arranged one after the other between the planes of separation and when in the case of the consecutive amplifier modules a first respective module end plane is coupled in an optically neutral manner to a second respective module end plane and when in the entirety of the amplifier modules the first module end plane of a first amplifier module is coupled in an optically neutral manner to one of the planes of separation and the second module end plane of the last amplifier module is coupled in an optically neutral manner to the other one of the planes of separation.

The simplest case of such an optically neutral coupling provides for the respective module end planes or the respective planes of separation and the module end planes to coincide.

One solution of a, in particular, quasi-neutral amplifier module designed in accordance with the invention provides for this to represent an optical system, the ABCD matrix of which, defined in accordance with A. E. Siegmann "Lasers", Univ. Science Books, Mill Valley, Calif., USA, 1986, pages 581 et seq., has the values $$0.97<|A|<1.03$$

$$-0.2\ m<B<0.2\ m$$

$$-0.2\ 1/m<C<0.2\ 1/m$$

$$0.97<|D|<1.03.$$

With respect to the arrangement of the laser-active medium within the amplifying unit or within the amplifier modules, no further details have so far been given.

The laser-active medium could, for example, be arranged in a gas or in a liquid as carrier.

The laser system according to the invention is, however, particularly suitable for an embodiment, with which the laser-active medium is arranged in at least one solid-state body.

With respect to the shape of the at least one solid-state body, any optional designs are, in principle, conceivable.

It is favorable when the at least one solid-state body extends transversely to the optical axis.

In principle, the at least one solid-state body could be a bar extending in the direction of the optical axis or a parallelepiped extending in the direction of the optical axis, for example in the case of a slab laser.

One particularly favorable solution provides for the at least one solid-state body to have an extension transversely to the optical axis in every direction which is greater, in particular, many times greater than the extension in the direction of the optical axis.

Such a solid-state body has the advantage that, as a result, the influence on the amplifying unit or rather the amplifier module by the laser-active medium can be limited, if need be reduced.

This applies, in particular, for the design of a so-called thermal lens in the solid-state body.

It is particularly favorable when the at least one solid-state body is of a plate-like design.

Such a solid-state body of a plate-like design preferably acts such that it influences the amplifying unit or the amplifier module optically as little as possible.

Alternatively thereto, it is, however, also conceivable to design the at least one solid-state body such that it acts in a focusing or defocusing manner, i.e. has defined imaging properties in conjunction with the amplifying unit or the amplifier module.

In principle, the at least one solid-state body can be arranged at any optional location on the amplifier module between the module end planes when the solid-state body has the amplifier module radiation field passing through it and is, therefore, in a position to amplify it.

In principle, the energy for the optical amplifying process can be supplied to the laser-active medium in the most varied of way. In the case of an optical pumping of the laser-active medium, electromagnetic radiation is supplied in the area of a pumping light spot in order to bring about the laser-active excitation states in the laser-active medium.

One particularly favorable solution provides, in this case, for the at least one solid-state body to be arranged in an area of the amplifier module radiation field, in which the cross section of the amplifier module radiation field is smaller than a pumping light spot. This solution has the advantage that, with it, an optimum exploitation of the pumping light can be achieved.

With respect to the arrangement of the at least one solid-state body relative to the optical elements of the amplifier module, any optional arrangements are conceivable.

It is preferably provided, in particular, for the at least one solid-state body to be arranged so as to be uncorrelated to optical imaging elements of the amplifier module, i.e. the at least one solid-state body need not be arranged in any defined optical correlation to the optical elements of the amplifier module in order to be operative.

Alternatively thereto, in particular when defined ratios are required in the area of the solid-state body and, therefore, in the area of the laser-active medium, it is provided for the at least one solid-state body to be arranged in a plane of imaging of the amplifier module.

The plane of imaging can be arranged at different locations in accordance with the optical configuration of the amplifier module. For example, it is conceivable to provide a module end plane as plane of imaging.

One particularly favorable solution provides for the plane of imaging of the amplifier module to be arranged between two adaptation branches.

One solution, in particular a solution with several solid-state bodies, preferably provides for several planes of imaging to be arranged between two or more adaptation branches.

The adaptation branches are preferably formed by optical telescopes, wherein these optical telescopes can be designed as Kepler telescopes, Galileo telescopes or other telescopes, in particular mirror telescopes, as well.

In the case of several planes of imaging is it expedient when an intermediate imaging branch, which images the radiation field states of the one plane of imaging onto the other plane of imaging in a defined manner, is arranged between two planes of imaging.

In this respect, it is favorable, in particular, when the intermediate imaging branch is designed to be optically neutral.

In order to be able to also provide a correction of the phase ratios in order to achieve a quasi-neutral behavior of the amplifier module, a phase correction element varying an optical path length is preferably arranged in one plane of imaging of the amplifier module.

When several planes of imaging are provided, phase correction elements can be provided in several planes of imaging, in particular in order to optimize a phase correction.

This phase correction element can be designed in the most varied of ways.

For example, this phase correction element could be an adaptive mirror or an element with various optical delay paths.

With respect to the design of the resonator, no further details have been given in conjunction with the preceding explanations concerning the individual embodiments.

One particularly favorable solution, for example, provides for the resonator to be a stable resonator.

Alternatively thereto, it is conceivable for the resonator to be an unstable resonator.

In the case of an unstable resonator, it is preferably provided for the virtual planes of separation to be located in an area of the unstable resonator which has wave fronts passing through it in opposite directions to at least 70%.

Alternatively to the provision of a stable or unstable resonator, one additional solution according to the invention provides for the resonator to be a ring resonator.

A further, expedient embodiment provides for the resonator to be a hybrid resonator.

In addition, the object specified at the outset is also accomplished by a method for setting up a laser amplifier system in accordance with the method claims.

Additional features and advantages of the invention are the subject matter of the following description as well as the drawings illustrating several embodiments.

BRIEF DESCRIPTION OF THE DRAWINGS

FIG. 1 shows a schematic illustration of a first embodiment of a laser amplifier system according to the invention with a stable resonator and an amplifying unit;

FIG. 2 shows a schematic illustration of the configuration of the stable resonator according to FIG. 1 in the non-split state, in which the virtual planes of separation coincide;

FIG. 3 shows a schematic illustration of the laser amplifier system according to the invention with several amplifier modules forming the amplifying unit;

FIG. 4 shows a schematic illustration of a first embodiment of an amplifier module according to the invention;

FIG. 5 shows an illustration of the intensity profiles respectively normalized to a maximum value in the module end planes of the amplifier module according to FIG. 4;

FIG. 6 shows an illustration of a quotient of the intensity profiles in FIG. 5;

FIG. 9 shows an illustration similar to FIG. 4 of a second embodiment of an amplifier module according to the invention;

DETAILED DESCRIPTION OF THE INVENTION

Figure 7:
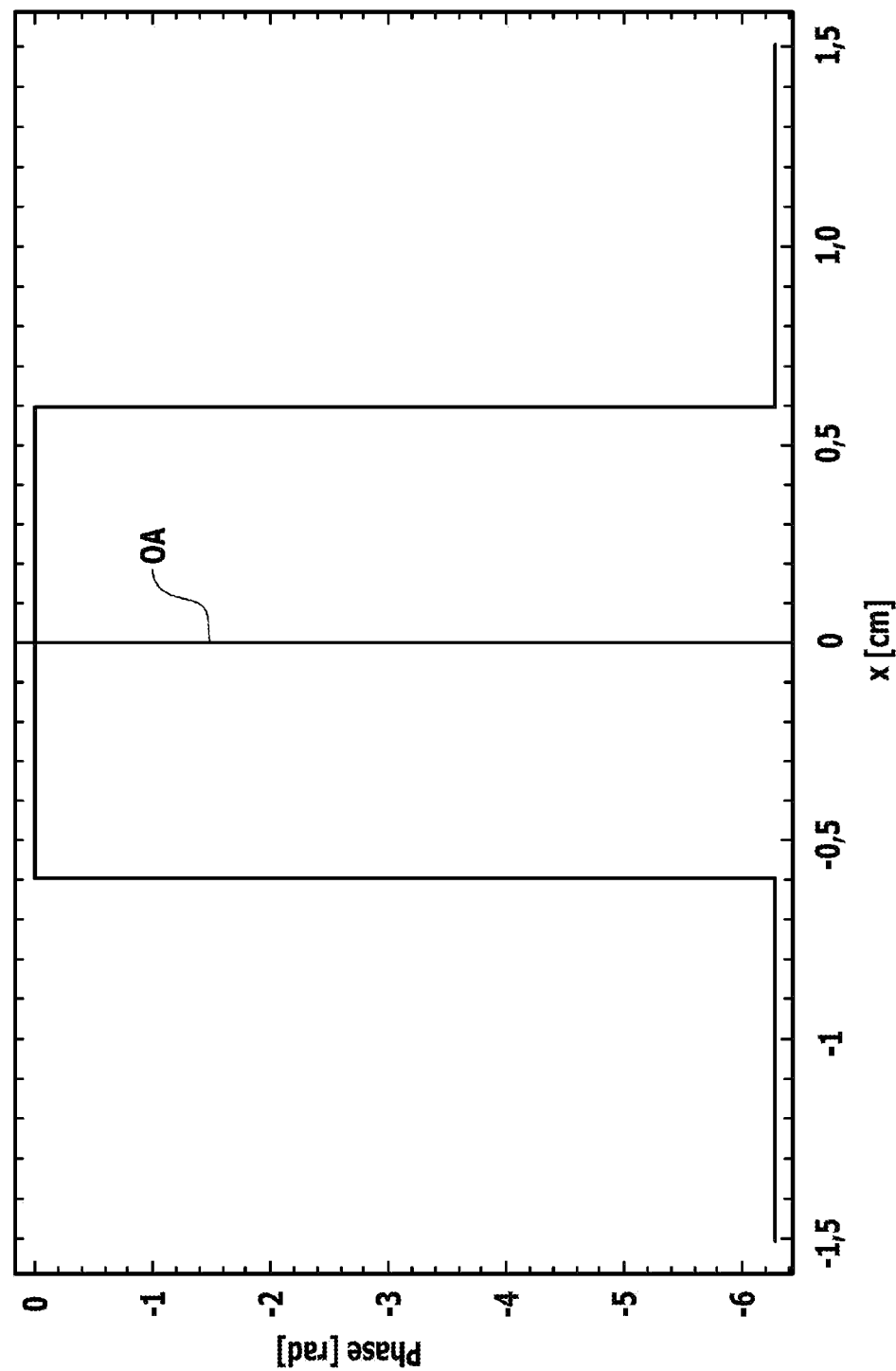
FIG. 7 shows an illustration of the phase difference between the phase profiles in the module end planes in the amplifier module according to FIG. 4 in the ideal case of optical neutrality.

A first embodiment, illustrated in FIG. 1, of a laser amplifier system 10 according to the invention, which is arranged along an optical axis OA, comprises a resonator 12 and an amplifier unit 14 which is designed to be optically independent of the resonator 12 and borders on resonator sections of the resonator, which is designed to be split, in a direct optical manner with end planes 16 and 18.

A resonator 12 designed to be split is to be understood in that resonator sections 20, 30 extend from two respective virtual planes of separation 22 and 32, wherein the virtual planes of separation 22 and 32 coincide with the end planes 16 and 18 of the amplifier unit and wherein the resonator sections 20, 30 have an optical layout which assumes that the amplifier unit 14 does not exist optically and the virtual planes of separation 22 and 32 coincide, as illustrated in FIG. 2, so that the optical behavior of the amplifier unit 14 is not mode-relevant for the optical layout of the resonator sections 20 and 30 with the resonator modes provided, i.e. the predetermined resonator modes will not be altered by the amplifier unit.

The resonator sections 20, 30 preferably comprise optical resonator elements 24, 34 which define the resonator radiation field sections 26, 36, respectively, adjoining the respective planes of separation 22, 32.

Since the optical layout of the resonator 12 is brought about under the premise that the planes of separation 22 and 32 coincide, the resonator radiation field sections 26 and 36 have in the planes of separation 22 and 32 radiation field states which lead to identical mode ratios in both resonator radiation field sections 26, 36 in at least one operating state of a predetermined range of operating states of the laser amplifier system, i.e. the radiation field modes forming in the resonator radiation field sections 26 and 36 correspond to the radiation field modes of a resonator 12 illustrated in FIG. 2 with coinciding planes of separation 22, 32.

In the case of the laser amplifier system 10 according to the invention, the formation of the resonator radiation field sections 26, 36 is therefore defined by the optical set-up of the resonator sections 20, 30, in particular by their optical resonator elements 24, 34, and is independent of any optical behavior of the amplifier unit 14 which is inserted between the planes of separation 22, 32 in the split resonator 12.

In the simple example of a stable resonator 12 illustrated in FIG. 1, the optical resonator elements 24 and 34 of the resonator radiation field sections 26, 36 are, for example, reflecting and, in addition, focusing elements, wherein the optical resonator element 34 is not designed to be completely reflecting and so part of the resonator radiation field section 36 is coupled out into an exiting radiation field 40.

The amplifier unit 14 which is designed to be optically independent of the resonator comprises, as illustrated in FIG. 1, for example, an amplifier module 50 or, as illustrated in FIG. 3, several amplifier modules 50 which are located between the planes of separation 22 and 32 and form the amplifier unit 14 in FIG. 1 or the amplifier unit 14' in FIG. 3.

In this respect, each of the amplifier modules 50 extends between first and second module end planes 52 and 54, wherein in the case of the plurality of amplifier modules 50 which are arranged one behind the other in the amplifier unit 14', as illustrated in FIG. 3, with consecutive amplifier modules, for example the amplifier modules 50a and 50b, second module end planes 54 coincide with the next following first module end planes 52, i.e., for example, the module end planes 54a and 52b.

Furthermore, the first module end plane 52a of the first amplifier module 50a of a row of consecutive amplifier modules 50 coincides with the end plane 16 while the second module end plane 54n of the last amplifier module 50n coincides with the second end plane 18 so that in the case of the plurality of amplifier modules 50 of the amplifier unit 14' the amplifier modules 50 which merge directly into one another in the area of their module end planes 52, 54 adjoin the resonator section 20, on the one hand, and the resonator section 30, on the other hand, as an entirety.

It is, however, also possible to design the amplifier unit 14 such that a 1:1 telescope is arranged between module end planes 52, 54 of consecutive amplifier modules 50 or between a module end plane 52, 54 of an amplifier module 50, which is located closest to an end plane 16, 18, and this end plane 16, 18, this telescope bringing about an optically neutral transformation, i.e. resulting in other words in an optically quasi-neutral coupling.

In the formalism of the ABCD matrix, as described, for example, in A. E. Siegmann "Lasers", Univ. Science Books, Mill Valley, Calif., USA, 1986, pages 581 et seq. or in YARIV, Imaging of coherent fields through lenslike systems, Oct. 15, 1994/Vol. 19, No. 20/OPTICS LETTERS, page 1607, this means that $0.97 < |A| < 1.03$ $-0.2\ m < B < 0.2\ m$ $-0.2\ 1/m < C < 0.2\ 1/m$ $0.97 < |D| < 1.03,$ or better $0.99 < |A| < 1.01$ $-0.1\ m < B < 0.1\ m$ $-0.1\ 1/m < C < 0.1\ 1/m$ $0.99 < |D| < 1.01.$ In the case of the solution according to the invention, the amplifier modules 50 can be constructed optically in the most varied of ways.

In a first embodiment, the amplifier module 50 comprises optical imaging elements 56 and 58 which define an amplifier module radiation field 60 which extends between the module end planes 52 and 54 and which passes through an optically pumped laser-active medium LM which is embedded, for example, in small solid-state plate members 62 and 64, wherein the small solid-state plate members 62 and 64 represent thin disks, as used in laser systems according to the European patent applications 0 632 551 A. In this respect, the cooling of the small solid-state plate members 62 and 64 has been omitted in the principle illustration according to FIG. 4.

Pumping of the optically amplifying laser-active medium LM in the small solid-state plate members 62 and 64 is brought about by incoming pumping light radiation 66 and 68, respectively, which generates in the small solid-state plate members 62 and 64 a pumping light spot 72 and 74, respectively, which is, for example, of such a size that an amplifier module radiation field cross section 76 and 78, respectively, is located in the small solid-state plate members 62, 64 within the pumping light spot 72 and 74, respectively, wherein the pumping light spot 72, 74 is preferably dimensioned such that it is at least as large as the amplifier module radiation field cross section 76 and 78, respectively, but encompasses it completely.

The imaging elements 56 and 58 as well as the small solid-state plate members 62 and 64 form, altogether, an optical system 80 which defines as a whole the course of the amplifier module radiation field 60 between the module end planes 52, 54.

This optical system 80 is preferably dimensioned such that the ABCD matrix has, according to the theoretical approach in A. E. Siegmann "Lasers", Univ. Science Books, Mill Valley, Calif., USA, 1986, pages 581 et seq. or in YARIV, Imaging of coherent fields through lenslike systems, Oct. 15, 1994/Vol. 19, No. 20/OPTICS LETTERS, page 1607, the values:

$0.97 < |A| < 1.03$ $-0.2\ m < B < 0.2\ m$ $-0.2\ 1/m < C < 0.2\ 1/m$ $0.97 < |D| < 1.03,$ preferably:

$-0.98 < |A| < 1.02$ $-0.15\ m < B < 0.15\ m$ $-0.15\ 1/m < C < 0.15\ 1/m$ $-0.98 < |D| < 1.02,$ even better:

$-0.99 < |A| < 1.01$ $-0.1\ m < B < 0.1\ m$ $-0.1\ 1/m < C < 0.1\ 1/m$ $-0.99 < |D| < 1.01.$

An optical system 80 having such values is designated within the framework of the present patent application as an optically quasi-neutral system.

Such an optical system 80 is without any mode-relevant optical influence on the resonator modes in the resonator radiation field forming in the resonator 12.

In the optical system 80 according to the invention, the small solid-state plate members 62 and 64 are preferably designed such that their extension in the direction of the optical axis OA represents the thickness of the small solid-state plate members 62, 64 which have, transversely to the optical axis OA, an extension which is greater than the thickness of the small solid-state plate members 62, 64 by more than a factor of 5, is preferably greater by a factor of 10, in every direction in relation to the optical axis OA.

As a result, the influence on the optical system 80 of the optical properties of the small solid-state plate members 62, 64 may be kept within limits for the layout.

As illustrated in FIG. 4, the first embodiment of the amplifier module 50 comprises optical imaging elements 56 and 58 which are arranged between the module end planes 52, 54 and dimensioned with respect to their imaging properties in coordination with the imaging properties of the small solid-state plate members 62, 64 such that, as illustrated in FIG. 5, an intensity profile $IP_1$ in one of the module end planes 52, 54, this profile representing some of the radiation field states and being normalized to a maximum intensity in the respective module end plane 52, 54, is transformed to an intensity profile $IP_2$ in the other one of the module end planes 54, 52, this profile being normalized to a maximum intensity in the respective module end plane 52, 54, in a manner retaining the intensity profile shape, wherein a retention of the intensity profile shape results, in particular, in a central area Z which represents the smallest cross sectional area of the respective intensity profile $IP_1$, $IP_2$ which comprises 80% of the overall optical power, even better 90% of the overall optical power.

A quotient of the intensity profiles $IP_1$ and $IP_2$, illustrated in FIG. 6, shows that the deviation of the intensity values, which are normalized to the maximum value, over the entire beam cross section is preferably less than 5%.

Figure 8:
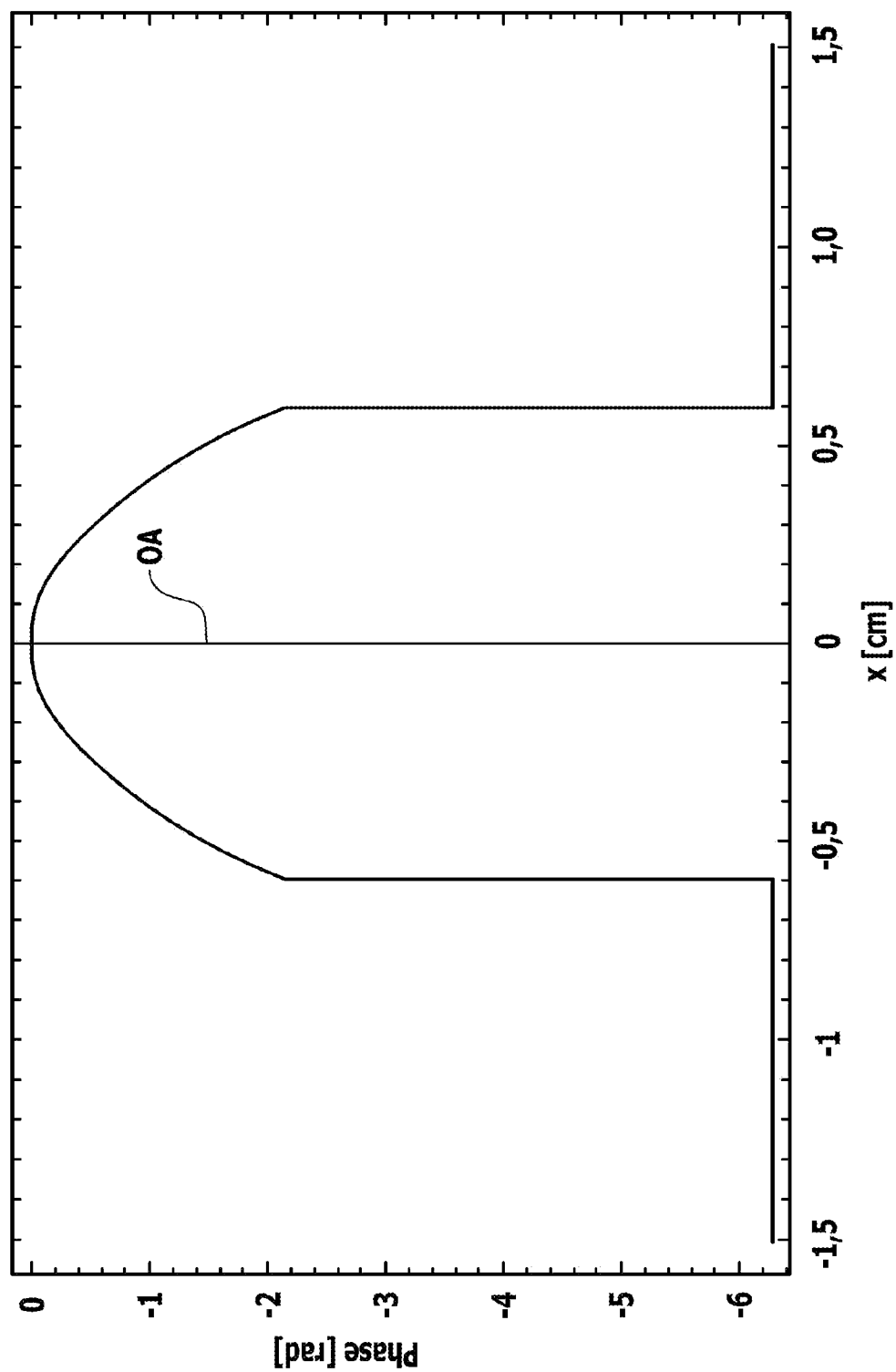
FIG. 8 shows an illustration of the phase difference in the phase profiles according to FIG. 4 in the case of a non-ideal optical neutrality, i.e. quasi-neutrality.

The optical imaging elements 56 and 58 in conjunction with the small solid-state plate members 62, 64 in FIG. 4 do, however, transform not only the intensity profile from one module end plane 52, 54 to the respectively other module end plane 54, 52 but also phase profiles $PP_1$ and $PP_2$ which represent radiation field states, wherein in the case of an amplifier module 50 which behaves ideally in an optically neutral manner a difference in the two phase profiles $PP_1$ and $PP_2$ results, as illustrated in FIG. 7, whereas the relative phase illustrated in FIG. 8 for the case of an amplifier module 50 not behaving ideally in an optically neutral manner, which corresponds to the difference in the phase profiles $PP_1$ and $PP_2$, results in variations of less than 4 rad, even better less than 3 rad.

In a second embodiment of an amplifier module 50' according to the invention, illustrated in FIG. 9, the optically amplifying laser-active medium LM is integrated into the imaging elements 56', 58' so that the additional small solid-state plate members 62, 64 as carriers for the laser-active medium LM can be omitted. In this case, the effects of the solid-state plate members on the optical system 80' are not applicable and so this can be dimensioned more easily.

In the first and second embodiments of the optical system 80 and 80' according to the invention, the arrangement of the laser-active medium LM is independent of its position in the amplifier module radiation field 60; it has merely to be taken into account for the arrangement of the laser-active medium LM that the respective pumping light spot 72, 74 is adapted to the amplifier module radiation field cross section 76, 78 in order to pump the laser-active medium LM efficiently, where applicable in adaptation to the selected resonator modes, and to obtain an efficient amplification of the amplifier module radiation field 60.

As for the rest, reference is made in full to the preceding explanations with respect to the description of the remaining features, in particular the features of the amplifier module, in the case of the second embodiment.

Figure 10:
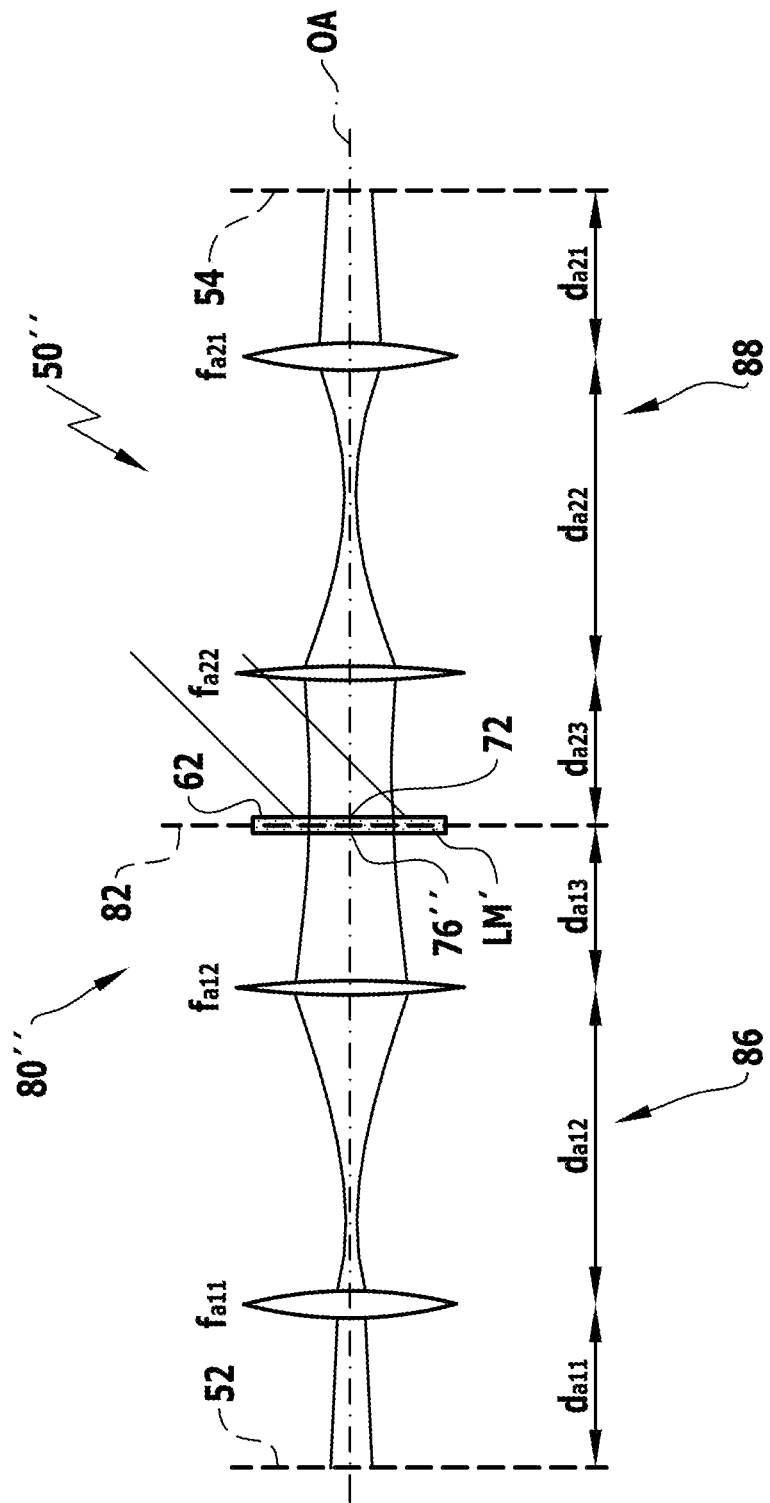
FIG. 10 shows an illustration of a third embodiment of an amplifier module according to the invention.

In a third embodiment of an amplifier module 50", illustrated in FIG. 10, the overall properties of the optical system 80" are the same as in the first and second embodiments, i.e. the optical system 80" behaves quasi-neutrally in accordance with the definition given above.

In contrast to the first and second embodiments, the optical system 80" of the third embodiment of an amplifier module 50" according to the invention is designed such that the small solid-state plate member 62 is arranged in a plane of imaging 82 of the optical system 80" and that the optical system 80" has two adaptation branches 86, 88 which are based on Kepler telescopes or other telescopes having, in particular, mirrors, have a magnification VG equal or unequal to 1 and image the amplifier module radiation field present in the plane of imaging 82 onto the module end plane 52 and the module end plane 54, respectively.

It is possible with such adaptation branches 86 and 88 to adapt the amplifier module radiation field cross section 76" to the desired ratios. For example, it is possible to adapt the amplifier module radiation field cross section 76" to the pumping light spot 72 on the small solid-state plate member 62 as a result of selection of the adaptation branches 86, 88.

The adaptation branches 86, 88 are designed such that the optical system 80" as a whole behaves quasi-neutrally in the manner described above with respect to its transformation behavior of radiation field states in the one module end plane 52, 54 to the respectively other module end plane 54, 52, wherein one of the adaptation branches 86, 88 has, in particular, a magnification VG of equal or unequal to 1 and the other one of the adaptation branches 88, 86 has the inverse magnification 1/VG.

Figure 11:
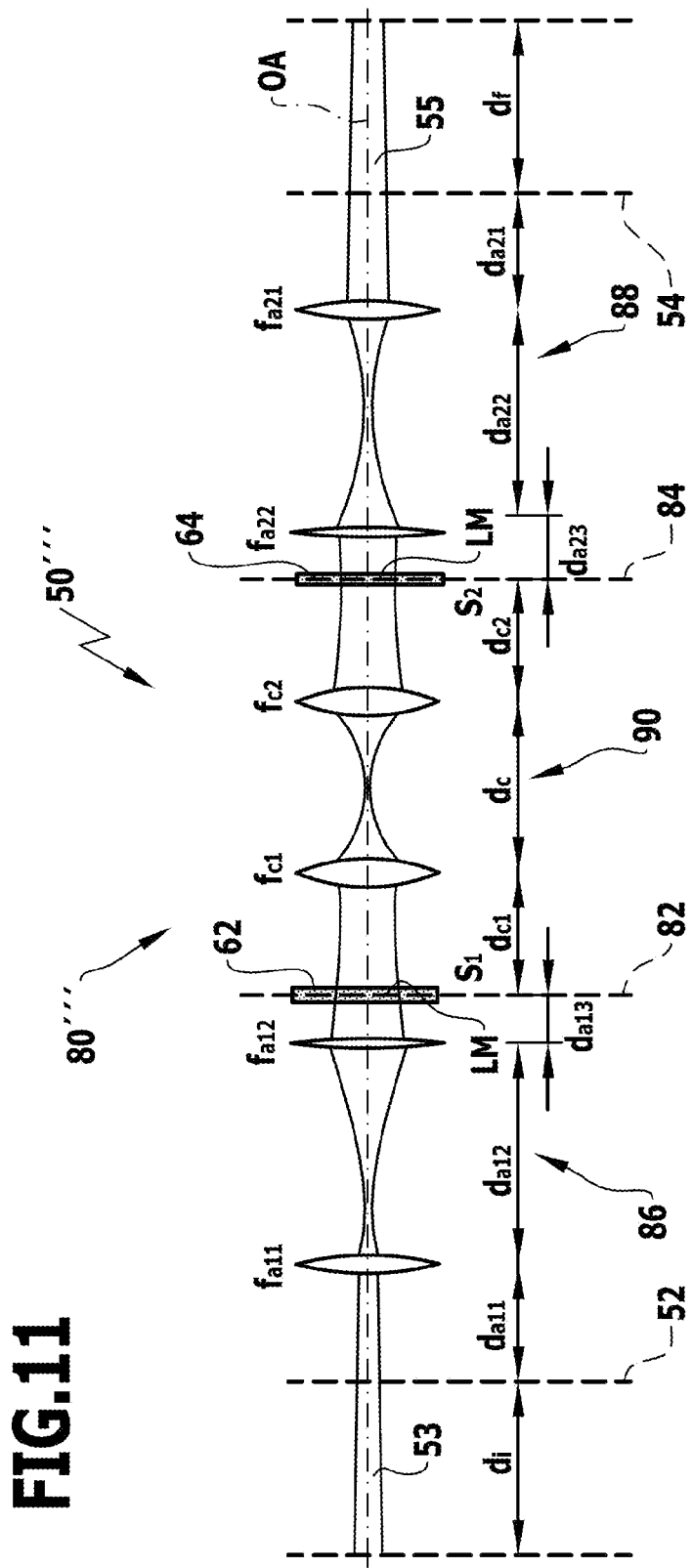
FIG. 11 shows an illustration similar to FIG. 4 of a fourth embodiment of an amplifier module according to the invention.

In a fourth embodiment of an amplifier module 50''' according to the invention, illustrated in FIG. 11, the optical system 80''' is dimensioned as a whole in the same way as described above and so this has the same transformation behavior between the module end planes 52, 54 as the preceding amplifier modules.

The radiation field pieces 53 and 55 adjoin the amplifier module 50''' on both sides and these are either pieces of resonator radiation field sections 26 and 36, respectively, which adjoin the module plane 52, 54 or of amplifier modules 50 which are adjacent to amplifier module radiation fields 60 or of radiation fields of additional, intermediate imaging systems.

In contrast to the preceding amplifier modules, the optical system 80''' does, however, comprise altogether two planes of imaging 82 and 84, in which the small solid-state plate members 62, 64 are, for example, arranged, between the module end planes 52, 54.

Furthermore, the optical system 80''' likewise comprises the two adaptation branches 86, 88 which are based on Kepler telescopes, wherein each of the adaptation branches 86, 88 images the radiation field states in the module end planes 52 and 54, respectively, onto the plane of imaging 82, 84 with a certain imaging ratio.

An intermediate imaging branch 90 is provided between the planes of imaging 82, 84 and this transforms the radiation field states in the plane of imaging 82 to the plane of imaging 84 and vice versa and behaves in this respect preferably quasi-neutrally within the framework of the definition given for this above.

Figure 12:
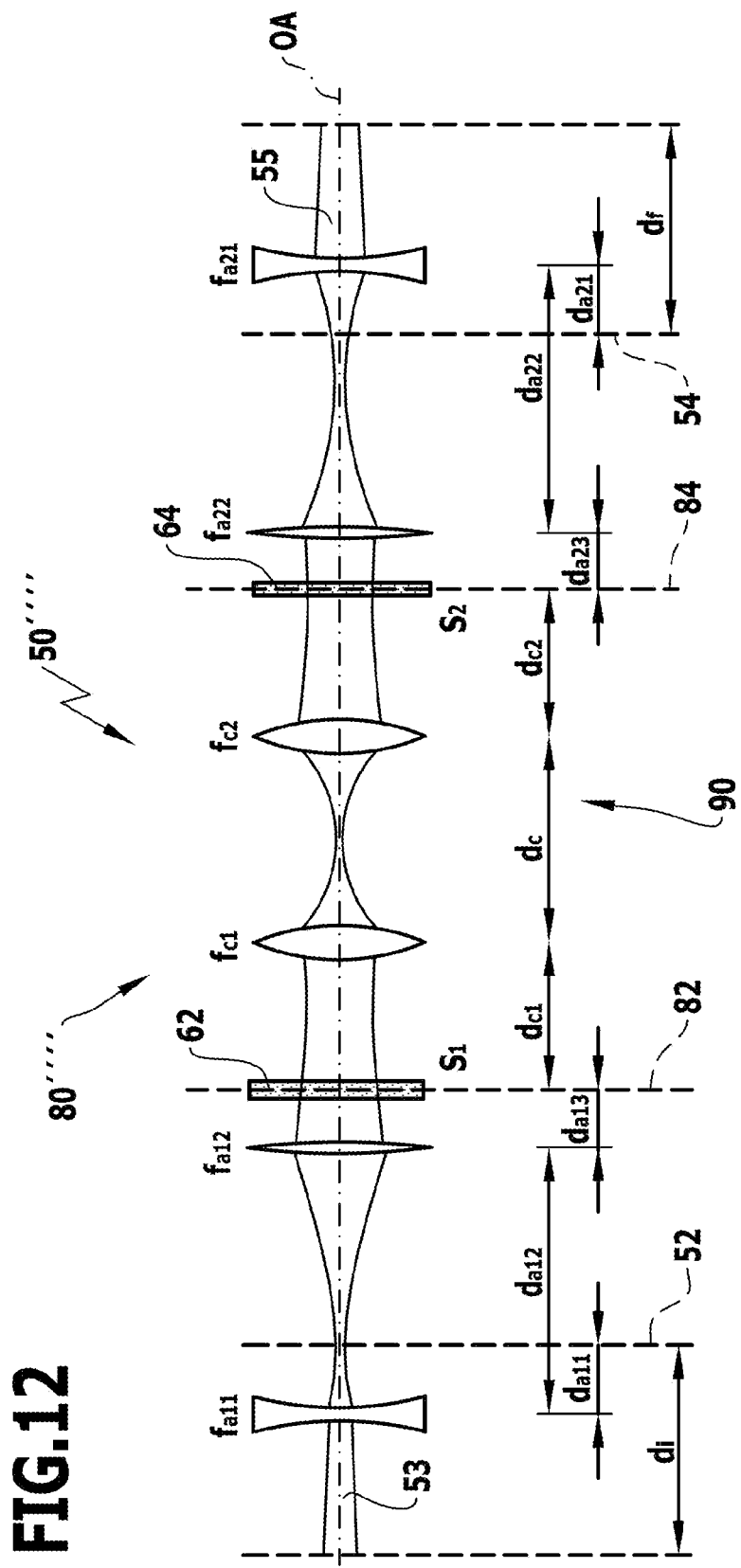
FIG. 12 shows a sectional illustration similar to FIG. 11 of a fifth embodiment of an amplifier module according to the invention.

In a fifth embodiment of an optical system 80"" of an amplifier module 50"", the adaptation branches 86', 88' are not constructed on the basis of Kepler telescopes, as in the third and fourth embodiments, but rather, for example, on the basis of Galileo telescopes with collimating optical elements, identifiable by the focal lengths $f_{a12}$ and $f_{a22}$, respectively, specified in FIG. 12, as well as with defocusing optical elements, identifiable by the focal lengths $f_{a11}$ and $f_{a21}$, respectively, specified in FIG. 12, or, for example, also based on other telescopes so that the module end planes 52 and 54, respectively, are located between the optical elements, identifiable by the focal lengths $f_{a11}$ and $f_{a12}$ or $f_{a22}$ and $f_{a21}$ specified in FIG. 12, of the Galileo telescopes. The defocusing optical elements, identifiable by the focal lengths $f_{a11}$ and $f_{a21}$ specified in FIG. 12 are, therefore, arranged in the radiation field pieces 53 and 55, respectively, which are located outside the respective amplifier module radiation field 60 which extends between the module end planes 52 and 54, respectively.

Such a construction is possible when the radiation field pieces 53 and 55, respectively, which are located outside the amplifier module radiation field 60, can be parts of resonator radiation field sections 26 and 36, respectively, or of amplifier modules 50 which border on amplifier module radiation fields 60 or of radiation fields of additional, intermediate imaging systems so that the respective, defocusing optical element, identifiable by the specified focal lengths $f_{a11}$ and $f_{a21}$, respectively, can be arranged in these radiation field pieces 53, 55 free of interference.

A precondition is, therefore, that the extension $d_i$ of the radiation field pieces 53, 55 in the direction of the optical axis OA must be greater than the distance $d_{a11}$ and $d_{a21}$, respectively, of the module end planes 52 and 54, respectively, from the defocusing optical elements, identifiable by the specified focal lengths $f_{a11}$ and $f_{a21}$, respectively.

Furthermore, the magnification VG in the case of adaptation branches 86', 88' based on Galileo telescopes is unequal to 1 and the one telescope has the magnification VG while the other telescope has the magnification 1/VG.

As for the rest, the intermediate imaging branch 90 of the fifth embodiment according to FIG. 12 is also identical to that of the fourth embodiment.

Figure 13:
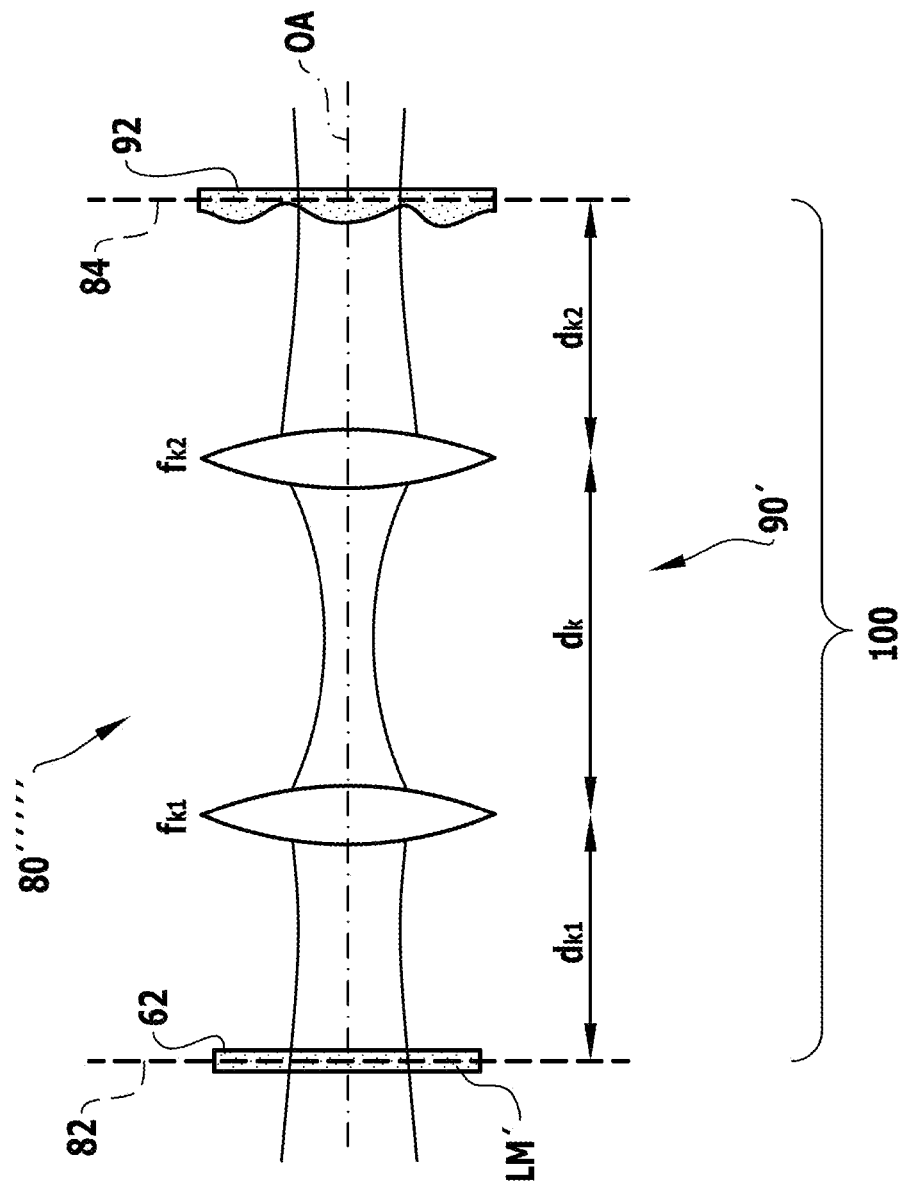
FIG. 13 shows a sectional illustration of a sixth embodiment of an amplifier module according to the invention with a phase correction element.

In a sixth embodiment of an optical system 80'''''', illustrated in FIG. 13, the small solid-state plate member 62 with the amplifying medium V is provided in one of the planes of imaging, for example the plane of imaging 82, while an adaptive optical element 92 is provided in the other plane of imaging, in this case the plane of imaging 84. The adaptive optical element 92 serves the purpose of correcting phase errors, in particular of the small solid-state plate member 82, for example phase errors generated by the optically laser-active medium LM which is provided in the small solid-state plate member 82, and so the intermediate imaging branch 90' together with the small solid-state plate member 62 and the adaptive optical element 92 form, altogether, a partial optical system 100 which behaves optically in a quasi-neutral manner within the meaning of the definition given above between the adaptation branches 86 and 88 which are not illustrated in the fifth embodiment according to FIG. 13.

In a further variation of the optical system 80'''''', a further, adaptive optical element 92 is provided with an additional intermediate imaging branch 90' in an additional plane of imaging 84' and so a multiple and, therefore, optimized phase correction is possible. For example, it would be possible to provide, on the one hand, a spherical phase correction and, on the other hand, an aspherical phase correction.

Such a partial optical system 10 may be extended as required. For example, in a seventh embodiment of the optical system 80'''''' according to the invention, illustrated in FIG. 14, an additional plane of imaging 85, in which, for example, the small solid-state plate member 64 can be arranged, is provided between the planes of imaging 82 and 84. In this case, an intermediate imaging branch 90 is provided between the planes of imaging 82 and 85 and an intermediate imaging branch 90' between the planes of imaging 85 and 84 which, together with the small solid-state plate members 62 and 64 and the adaptive optical element 92, form the partial optical system 100' which is arranged, for its part, between the adaptation branches 86 and 88, which are likewise not illustrated in FIG. 14, and behaves, altogether, in a quasi-neutral manner within the meaning of the invention specified above.

Figure 15:
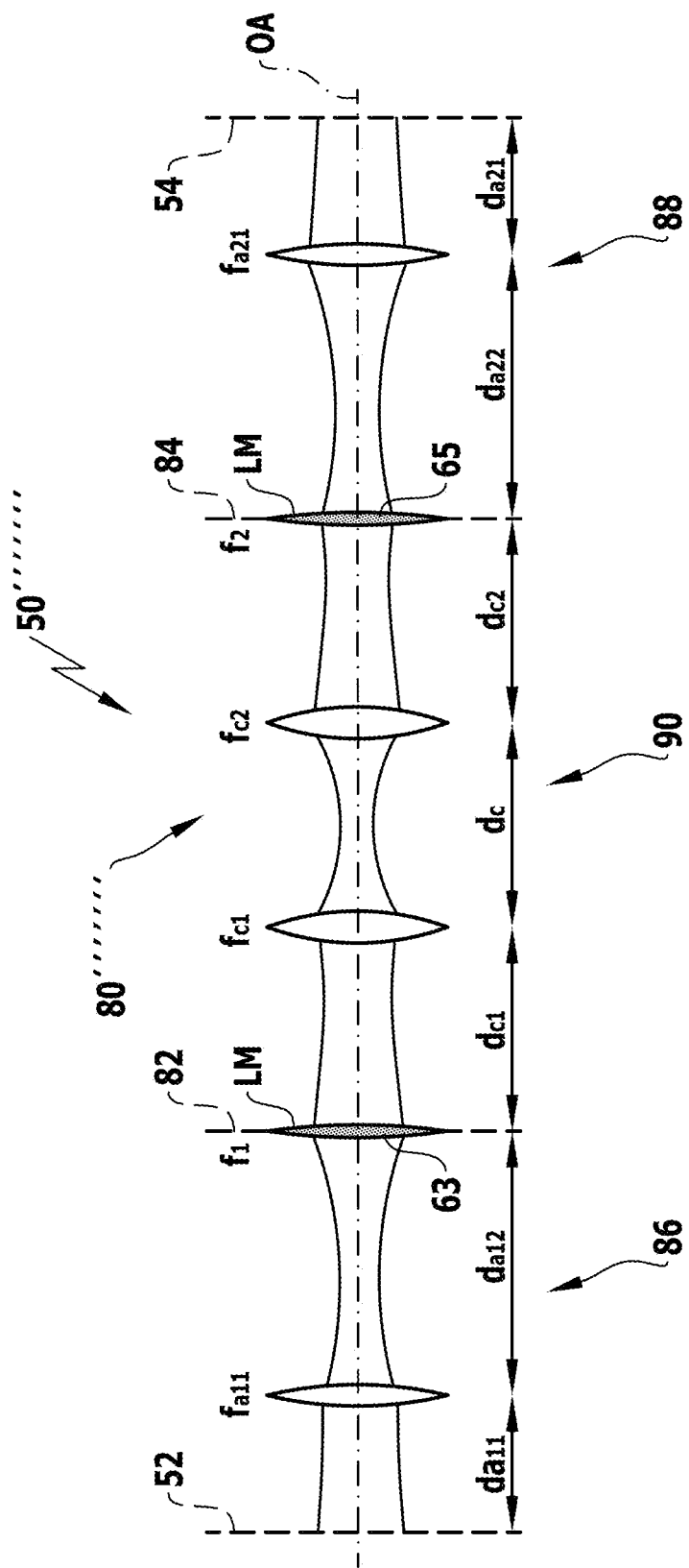
FIG. 15 shows an illustration similar to FIG. 4 of an eighth embodiment of an amplifier module according to the invention.
Figure 16:
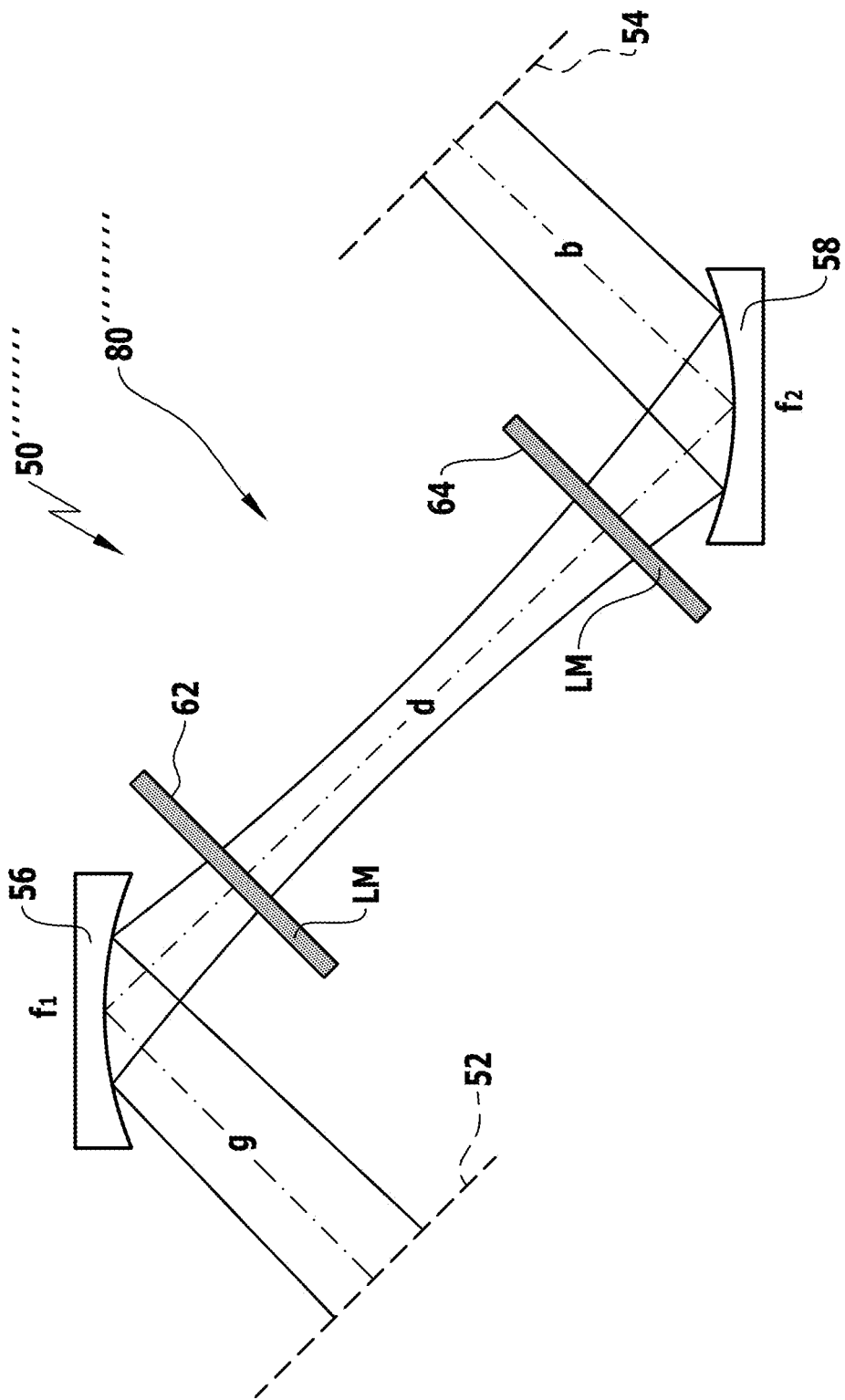
FIG. 16 shows an illustration of a ninth embodiment of an amplifier module according to the invention.

In an eighth embodiment of an optical system 80'''''' according to the invention, illustrated in FIG. 15, solid-state bodies 63 and 65 designed as imaging elements are provided in the planes of imaging 82 and 84, in modification of the fourth embodiment, illustrated in FIG. 11, as carriers for the optically amplifying medium V instead of the small solid-state plate members 62, 64 and these solid-state bodies are taken into consideration not only for the dimensioning of the adaptation branches 86 and 88 but also for the dimensioning of the intermediate imaging branch 90 on account of their imaging properties and so, altogether, the optical system 80'''''' according to the seventh embodiment behaves in a quasi-neutral manner.

Figure 14:
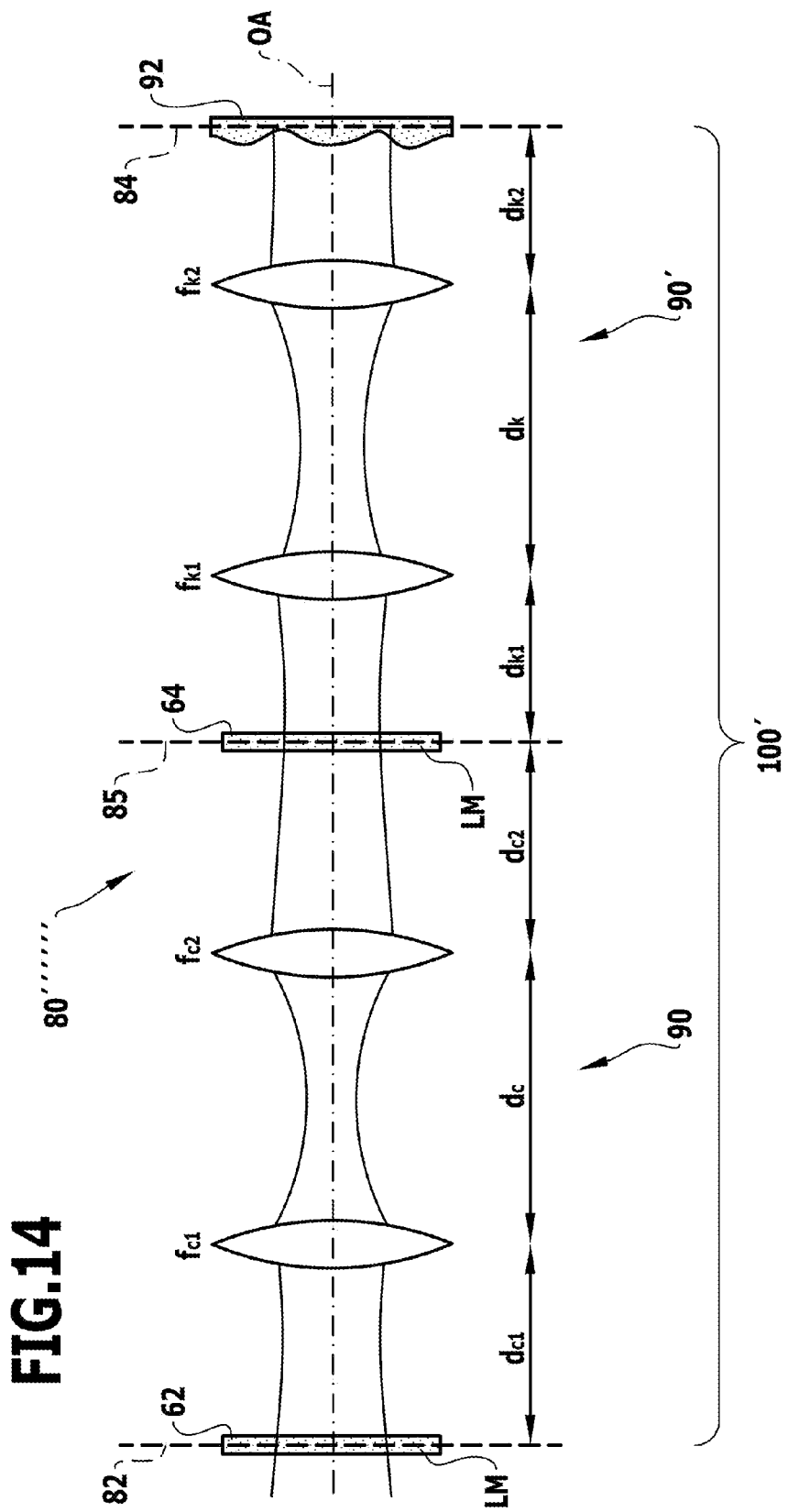
FIG. 14 shows a sectional illustration similar to FIG. 13 of a seventh embodiment of an amplifier module according to the invention.

The eighth embodiment can experience the same modifications as the fourth embodiment as a result of insertion of an adaptive optical element 92 in one of the planes of imaging 82, 84 and so, in this case, reference is made to the explanations concerning the sixth and seventh embodiments according to FIGS. 13 and 14, with the difference that optical elements 63, 65 are provided as carriers for the optically amplifying laser-active medium LM instead of the small solid-state plate members 62 and/or 64.

In a ninth embodiment of an amplifier module 50'''''' according to the invention, the optical system 80'''''' is designed as a folded system so that, for example, the optical imaging elements 56' and 58' are not transmissively operative imaging elements but rather reflectingly operative imaging elements.

In the same way as in the first embodiment, illustrated in FIG. 4, small solid-state plate members 62, 64 are arranged and operative, for example, between the optical imaging elements 56 and 58.

The optical system 80'''''' is likewise dimensioned such that it is, altogether, quasi-neutral within the meaning of the definition given in conjunction with the embodiments described above.

Figure 17:
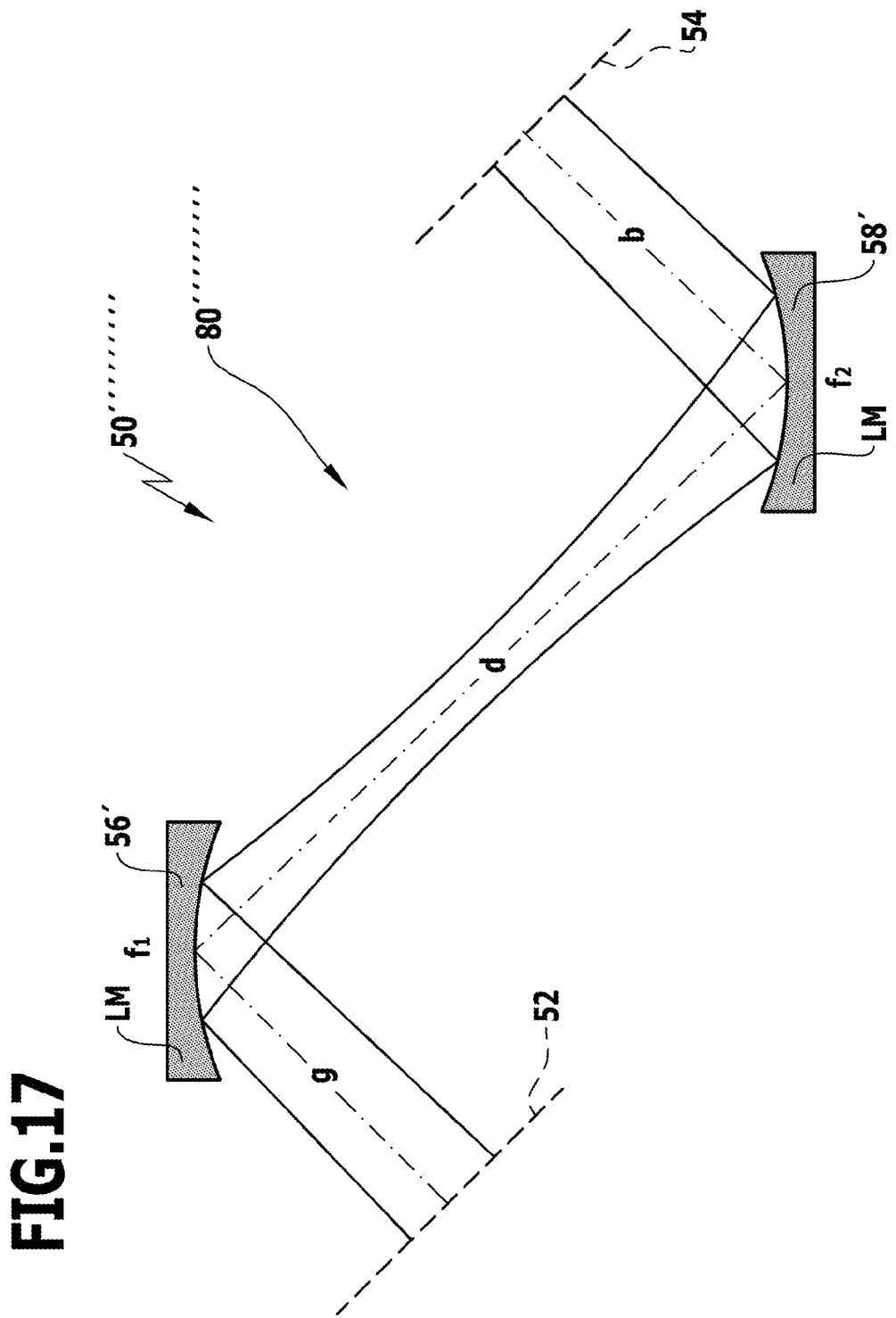
FIG. 17 shows an illustration of a tenth embodiment of an amplifier module according to the invention.

In modification of the ninth embodiment, the optically amplifying laser-active medium LM of a tenth embodiment, illustrated in FIG. 17, is, in analogy to the second embodiment, arranged in the imaging elements 56' and 58' so that the dimensioning of the optical system 80'''''' can be simplified.

A confocal resonator was represented as resonator 12 in conjunction with the first embodiment of the laser amplifier system according to the invention. In principle, the resonator 12 can, however, be of any optional design and the amplifier unit 14 can be arranged at the most varied of locations of the resonator.

Figure 18:
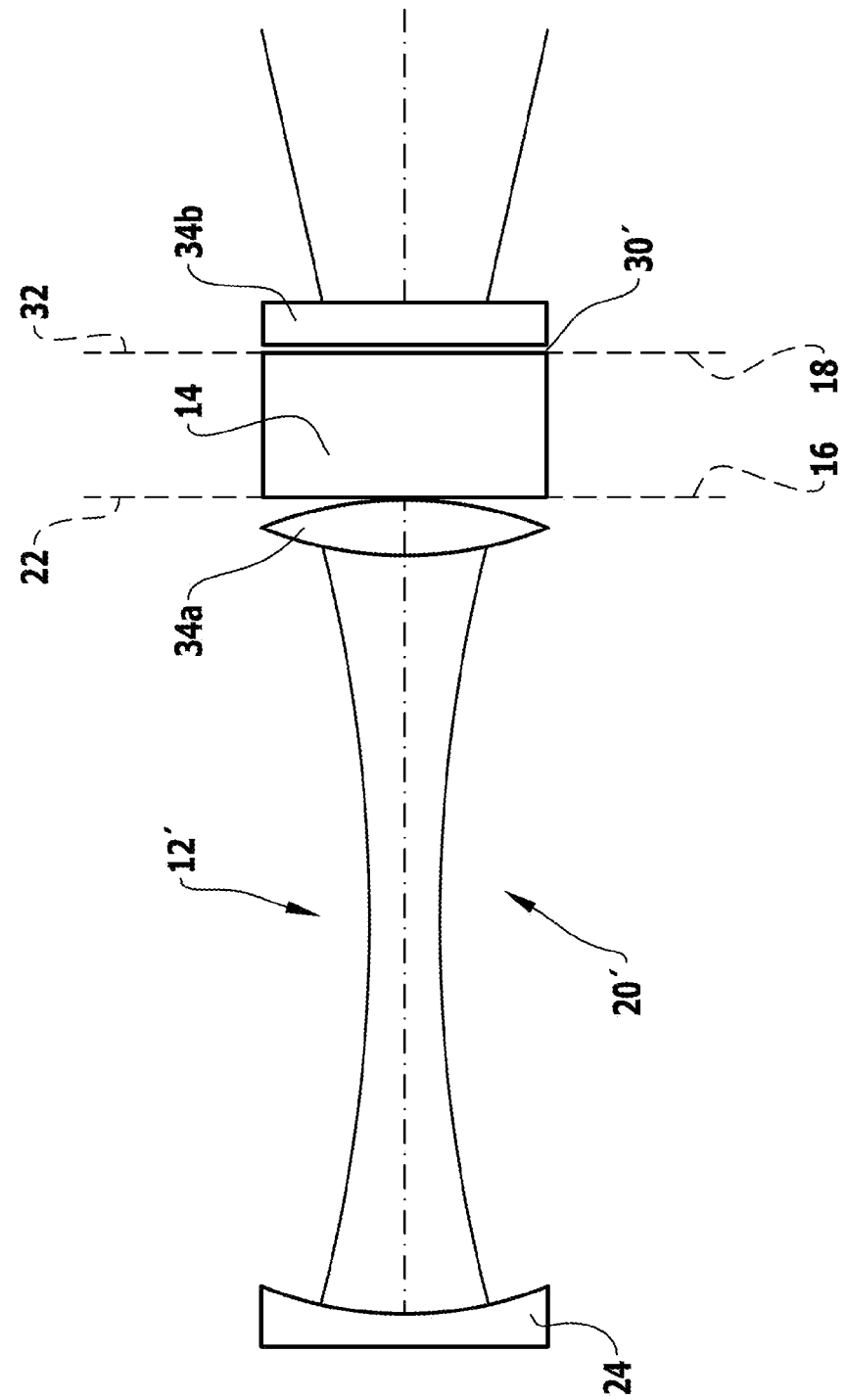
FIG. 18 shows an illustration of a second embodiment of a resonator according to the invention.

In FIG. 18, a confocal stable resonator 12' is likewise illustrated as second embodiment of a resonator according to the invention and in this case the planes of separation 22 and 32 are, however, located in the area of the optical resonator element 34, namely between the resonator element 34a and the resonator element 34b, wherein the resonator element 34a is an imaging resonator element and the resonator element 34b is a reflecting resonator element.

In this embodiment of the resonator according to the invention, the resonator section 20' extends from the resonator element 24 as far as the plane of separation 22 and comprises the resonator element 34a while the resonator section 30' is infinitesimally small and merely extends between the plane of separation 32 and the reflecting resonator element 34b which directly adjoins the plane of separation 32.

The amplifier unit 14 can be designed in the same way as in the first embodiment and comprise an amplifier module 50 or several amplifier modules 50.

Figure 19:
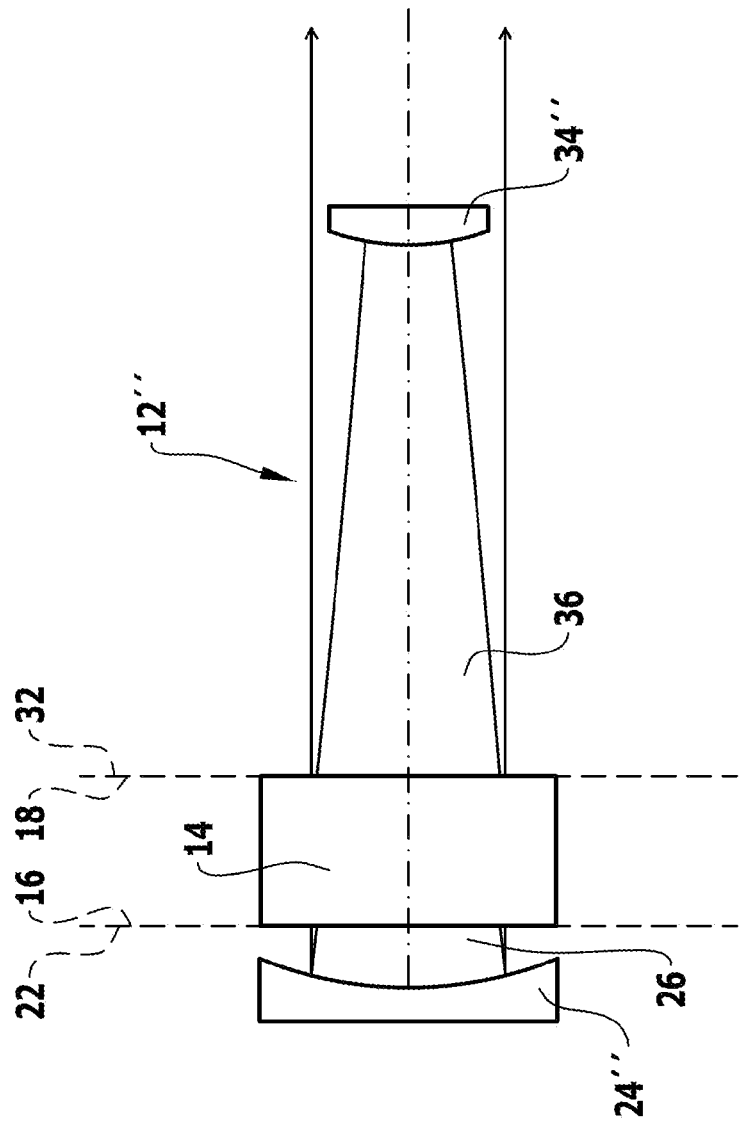
FIG. 19 shows an illustration of a third embodiment of a resonator according to the invention, designed as an unstable resonator.

In a third embodiment of a resonator 12" according to the invention, illustrated by way of example in FIG. 19, the resonator operates as an unstable resonator 12", wherein in the embodiment illustrated in FIG. 19 with a "positive branch" the optical resonator element 24" is the collimating resonator element while the resonator element 34" is the decollimating resonator element.

Figure 20:
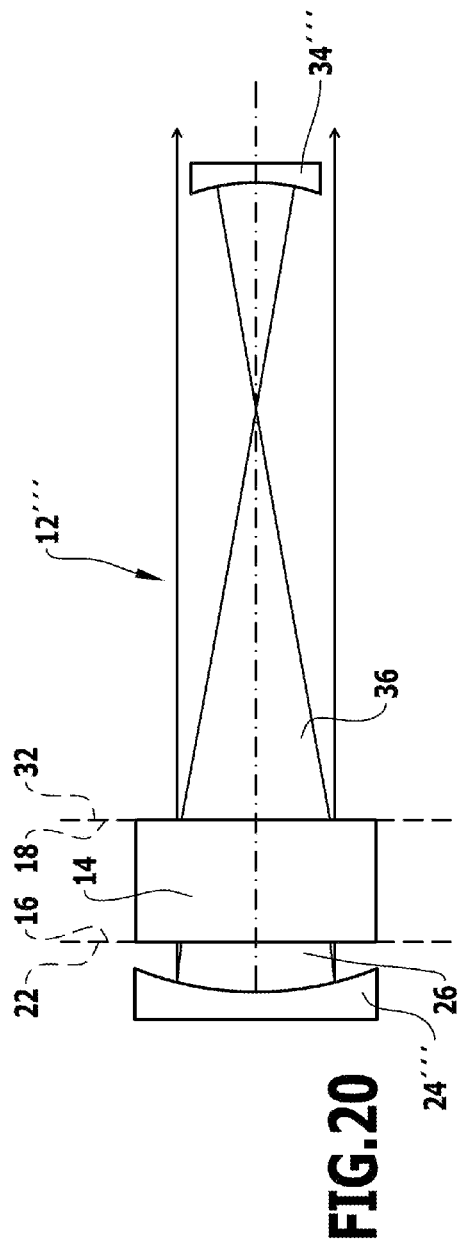
FIG. 20 shows an illustration of a fourth embodiment of a resonator according to the invention, illustrated as in unstable resonator.

In a fourth embodiment of a resonator 12''' according to the invention, illustrated in FIG. 20, the resonator element 34" is, in the case of the unstable resonator with a "negative branch", likewise designed to be collimating.

Whereas, in the case of a stable resonator, the position of the planes of separation 22, 32 can be selected optionally within the resonator 12''', in the case of the unstable resonator 12''' the position of the planes of separation 22, 32 has, for example, to be selected such that they are located as close as possible to the collimating optical resonator element 24" in order to ensure that the radiation field states generated by the resonator radiation field sections 26 and 36 in the planes of separation 22 and 32, respectively, are quasi identical since only in this case can the quasi-neutral amplifier unit 14 which is located between the planes of separation 22 and 32 be constructed from one or several amplifier modules 50 according to the invention.

As for the rest, reference is made in full to the preceding explanations with respect to the description of the remaining features, in particular the features of the amplifier modules.

Figure 21:
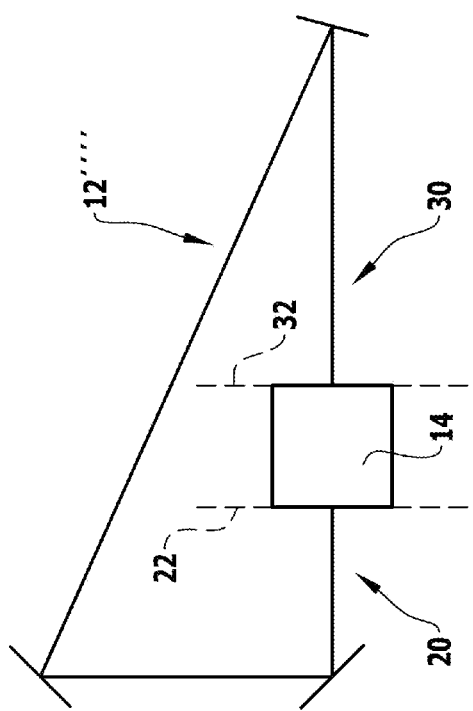
FIG. 21 shows an illustration of a fifth embodiment of a resonator according to the invention, designed as a ring resonator

In a fifth embodiment of a resonator 12'''' according to the invention, illustrated in FIG. 21, this is designed as a ring resonator and likewise split in the area of the planes of separation 22, 32 so that the amplifier unit 14 is arranged between the planes of separation 22, 32 in the same way as in the preceding embodiments and reference is made in full to the comments on the preceding embodiments with respect to the features of this amplifier unit.

Figure 22:
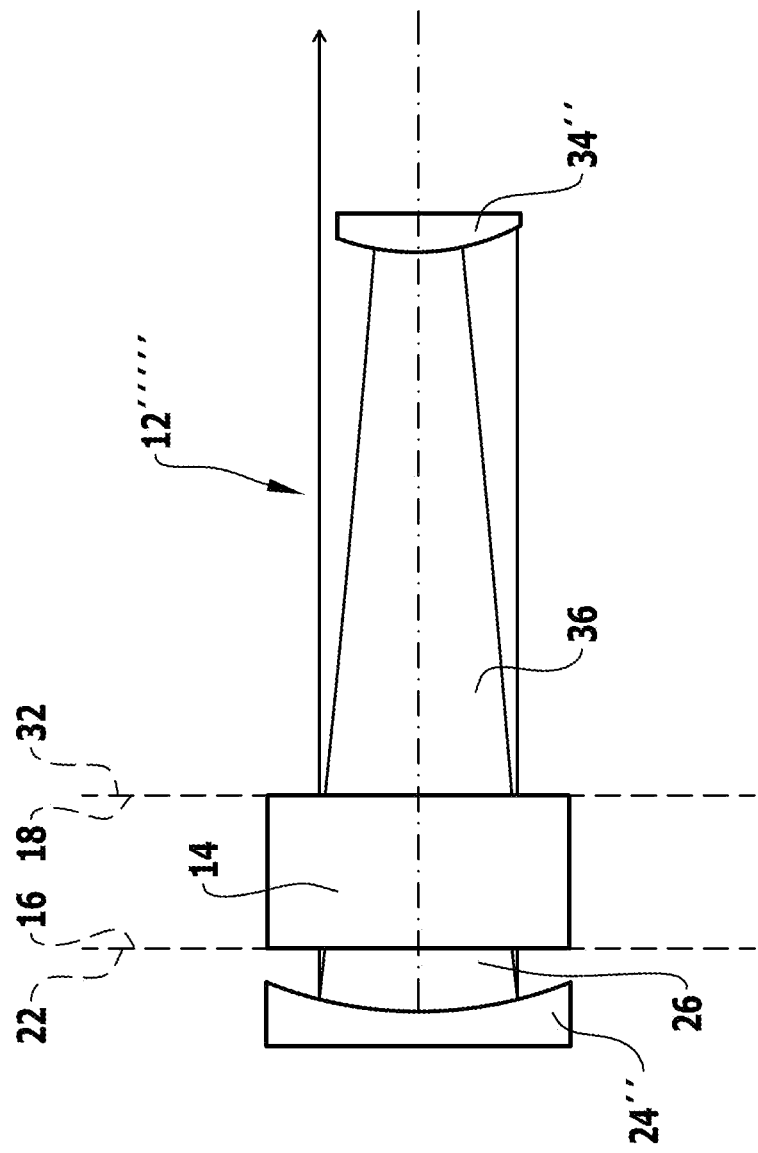
FIG. 22 shows an illustration of a sixth embodiment of a resonator according to the invention, designed as a hybrid resonator.

In a sixth embodiment of a laser amplifier system according to the invention, illustrated in FIG. 22, the resonator 12''''' is designed as a hybrid resonator which is unstable in the plane of drawing, wherein the planes of separation 22, 32 are located as close as possible to the collimating optical resonator element 24", similar to the unstable resonator.

The invention claimed is:

1. Laser amplifier system, comprising:
    a resonator with optical resonator elements determining a course of a resonator radiation field propagating along an optical axis,
    the resonator being designed as a split resonator and having a first resonator section extending from a first virtual plane of separation and a second resonator section extending from a second virtual plane of separation,
    the resonator sections being dimensioned optically such that the resonator radiation field has radiation field states corresponding to the same resonator modes in each of the virtual planes of separation,
    an amplifying unit optically independent of the resonator arranged between the first and the second virtual planes of separation, said amplifying unit comprising at least one laser-active medium and coupling the radiation field states corresponding to the same resonator modes in a quasi-neutral manner with respect to the resonator modes,
    the amplifying unit comprises at least one amplifier module having the at least one laser-active medium,
    the at least one amplifier module behaving in an optically quasi-neutral manner with respect to the resonator modes, and
    the at least one amplifier module being coupled to the virtual planes of separation in an optically quasi-neutral manner.

2. Laser amplifier system as defined in claim 1, wherein:
    each of the at least one amplifier modules extends between a first virtual module end plane and a second virtual module end plane and is dimensioned optically such that during operation of the laser amplifier system with at least an average power within a predetermined power range it transforms an intensity profile representing radiation field states of an amplifier module radiation field in one of the module end planes to the other one of the module end planes in at least one central area in a manner retaining the intensity profile shape, and
    a first one of the module end planes is coupled to the first plane of separation and a second one of the module end planes is coupled to the second plane of separation.

3. Laser amplifier system as defined in claim 2, wherein at least in the at least one central area intensity values of the intensity profile normalized to its maximum value, said intensity values representing individual radiation field state values, deviate from one another by a maximum of 20% of the maximum value in the locations in the module end planes respectively associated with one another as a result of imaging.

4. Laser amplifier system as defined in claim 2, wherein the at least one amplifier module transforms the intensity profile normalized to its maximum value in the one virtual module end plane to the other virtual module end plane essentially in a manner retaining the intensity profile shape.

5. Laser amplifier system as defined in claim 2, wherein the at least one amplifier module transforms a phase profile representing radiation field states from one module end plane to the other module end plane at least in the at least one central area in a manner retaining the phase profile shape.

6. Laser amplifier system as defined in claim 5, wherein a difference in phase values of the phase profiles in locations in the module end planes respectively associated with one another as a result of imaging is less than 4 rad at every point.

7. Laser amplifier system as defined in claim 2, wherein the at least one central area corresponds to a smallest cross sectional area of the amplifier module radiation field comprising 80% of overall power of the amplifier module radiation field.

8. Laser amplifier system as defined in claim 1, wherein the amplifying unit comprises one amplifier module, a first one of the module end planes coinciding with the first plane of separation and a second one of the module end planes coinciding with the second plane of separation with said module.

9. Laser amplifier system as defined in claim 1, wherein the amplifying unit comprises several amplifier modules.

10. Laser amplifier system as defined in claim 9, wherein:
    the several amplifier modules forming an entirety are arranged one after the other between the planes of separation,
    in the case of consecutive amplifier modules a first respective module end plane is coupled to a second respective module end plane in an optically quasi-neutral manner, and
    in the entirety of the amplifier modules the first module end plane of a first amplifier module is coupled optically to one of the planes of separation and the second module end plane of a last amplifier module is coupled optically to the other plane of separation.

11. Laser amplifier system as defined in claim 10, wherein:
in the case of the consecutive amplifier modules a first respective module end plane coincides with a second respective module end plane, and
in the entirety of the amplifier modules the first module end plane of a first amplifier module is coupled in an optically quasi-neutral manner to one of the planes of separation and the module end plane of the last amplifier module is coupled in an optically quasi-neutral manner to the other one of the planes of separation.

12. Laser amplifier system, comprising:
a resonator with optical resonator elements determining a course of a resonator radiation field propagating along an optical axis and at least one laser-active medium,
the resonator being designed as a split resonator and having a first resonator section extending from a first virtual plane of separation and a second resonator section extending from a second virtual plane of separation,
at least one amplifier module arranged between the first and the second virtual planes of separation, said amplifier module comprising the at least one laser-active medium,
the at least one amplifier module being arranged between the planes of separation such that a first module end plane of the at least one amplifier module is coupled in an optically quasi-neutral manner to the first plane of separation and a second module end plane of the at least one amplifier module is coupled in an optically quasi-neutral manner to the second plane of separation, and
the at least one amplifier module forming an amplifier module radiation field between the module end planes during operation of the laser amplifier system with at least an average power within a predetermined power range, said radiation field coupling the radiation field states in the module end planes to one another in an optically quasi-neutral manner at least in a central area.

13. Laser amplifier system as defined in claim 12, wherein:
several amplifier modules forming an entirety are arranged one after the other between the planes of separation, and
in the case of the consecutive amplifier modules a first respective module end plane is coupled in an optically quasi-neutral manner to a second respective module end plane, and
in the entirety of the amplifier modules the first module end plane of a first amplifier module is coupled in an optically quasi-neutral manner to one of the planes of separation and a second module end plane of a last amplifier module is coupled in an optically quasi-neutral manner to the other one of the planes of separation.

14. Laser amplifier system as defined in claim 12, wherein the at least one amplifier module represents an optical system, the ABCD matrix thereof having the values $0.97<|A|<1.03$ $-0.2 \text{ m}<B<0.2 \text{ m}$ $-0.2 \text{ 1/m}<C<0.2 \text{ 1/m}$ $0.97<|D|<1.03$.

15. Laser amplifier system as defined in claim 1, wherein the laser-active medium is arranged in at least one solid-state body.

16. Laser amplifier system as defined in claim 15, wherein the at least one solid-state body extends transversely to the optical axis.

17. Laser amplifier system as defined in claim 15, wherein the at least one solid-state body has an extension transversely to the optical axis in every direction greater than the extension in the direction of the optical axis.

18. Laser amplifier system as defined in claim 14, wherein the at least one solid-state body is of a plate-like design.

19. Laser amplifier system as defined in claim 17, wherein the at least one solid-state body is of a focusing or defocusing design.

20. Laser amplifier system as defined in claim 15, wherein the at least one solid-state body is arranged in the at least one amplifier module between the module end planes.

21. Laser amplifier system as defined in claim 15, wherein the at least one solid-state body is arranged in an area of the amplifier module radiation field where its amplifier module radiation field cross section is smaller than a pumping light spot.

22. Laser amplifier system as defined in claim 15, wherein the at least one solid-state body is arranged so as to be uncorrelated to optical imaging elements of the at least one amplifier module.

23. Laser amplifier system as defined in claim 15, wherein the at least one solid-state body is arranged in a plane of imaging of the at least one amplifier module.

24. Laser amplifier system as defined in claim 23, wherein the plane of imaging of the at least one amplifier module is arranged between two adaptation branches.

25. Laser amplifier system as defined in claim 24, wherein several planes of imaging are arranged between the adaptation branches.

26. Laser amplifier system as defined in claim 25, wherein an intermediate imaging branch is arranged between two planes of imaging.

27. Laser amplifier system as defined in claim 26, wherein the intermediate imaging branch is optically quasi-neutral.

28. Laser amplifier system as defined in claim 1, wherein a phase correction element varying an optical path length is arranged in one plane of imaging of the at least one amplifier module.

29. Laser amplifier system as defined in claim 1, wherein the resonator is a stable resonator.

30. Laser amplifier system as defined in claim 1, wherein the resonator is an unstable resonator.

31. Laser amplifier system as defined in claim 30, wherein the virtual planes of separation are located in an area of the unstable resonator having wave fronts passing through it in opposite directions to at least 70% of the overall diameter.

32. Laser amplifier system as defined in claim 1, wherein the resonator is a ring resonator.

* * * * *